US007410279B2

(12) United States Patent
Kawashima et al.

(10) Patent No.: US 7,410,279 B2
(45) Date of Patent: Aug. 12, 2008

(54) VEHICLE LAMP

(75) Inventors: Hiroshi Kawashima, Shizuoka (JP); Hidetada Tanaka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/635,057

(22) Filed: Dec. 7, 2006

(65) Prior Publication Data

US 2007/0127253 A1 Jun. 7, 2007

(30) Foreign Application Priority Data

| | | |
|---|---|---|
| Dec. 7, 2005 | (JP) | 2005-352838 |
| Dec. 7, 2005 | (JP) | 2005-352839 |
| Oct. 18, 2006 | (JP) | 2006-283588 |

(51) Int. Cl.
*B60Q 1/00* (2006.01)

(52) U.S. Cl. ....... 362/507; 362/309

(58) Field of Classification Search ....... 362/538, 362/522, 308, 309, 326–328, 331–340, 539, 362/507, 516, 520, 521

See application file for complete search history.

(56) References Cited

U.S. PATENT DOCUMENTS

| | | | | |
|---|---|---|---|---|
| 3,708,221 | A * | 1/1973 | Schaefer | 359/718 |
| 4,517,630 | A * | 5/1985 | Dieffenbach et al. | 362/509 |
| 6,821,008 | B2 * | 11/2004 | Tokoro et al. | 362/539 |

FOREIGN PATENT DOCUMENTS

| | | |
|---|---|---|
| JP | 4-21005 U | 2/1992 |
| JP | 2005-44683 A | 2/2005 |
| JP | 2005-141918 A | 6/2005 |
| JP | 2005-183090 A | 7/2005 |

* cited by examiner

*Primary Examiner*—Hargobind S Sawhney
(74) *Attorney, Agent, or Firm*—Sughrue Mion, PLLC

(57) ABSTRACT

A vehicle lamp has a light source and a lens that is arranged on a front side of the light source. The lens deflects and irradiates light from the light source toward a front side of the vehicle lamp. A front side surface of the lens includes a first freely formed curve surface, and an irradiation angle, with respect to the optical axis, of the light to be irradiated from the front side surface is set as a target irradiation angle at each point of the front side surface. A rear side surface of the lens includes a second freely formed curve surface formed by continuous surface elements, each having an inclination angle that realizes a light irradiation by the target irradiation angle set at respective points of the front side surface.

15 Claims, 23 Drawing Sheets

VEHICLE LAMP

The present invention claims priority from Japanese patent application no. 2005-352838 filed on Dec. 7, 2005, Japanese patent application no. 2005-352839 filed on Dec. 7, 2005, and Japanese patent application no. 2006-283588 filed on Oct. 18, 2006, the entire contents of which are incorporated herein by reference.

BACKGROUND OF THE INVENTION

1. Field of the Invention

The present invention relates to a vehicle lamp, in which a light source and a lens arranged on a front side of the lamp form a predetermined light distribution pattern.

2. Description of the Related Art

In a vehicle lamp such as a cornering lamp or a lamp unit of a headlamp, light from a light source arranged on an optical axis extended in a front and rear direction of the vehicle lamp is deflected and irradiated in a forward direction of the vehicle lamp by a lens arranged on a front side of the vehicle lamp, thereby forming a predetermined light distribution pattern.

For example, JP-A-2005-141918 describes an example of a cornering lamp, and JP-A-2005-44683 and JP-UM-A-4-21005 describe examples of lamp units of headlamps.

Further, JP-A-2005-183090 describes a projector-type lamp unit in a headlamp, in which a surface shape of a projecting lens thereof is set to a shape different from that of a normal projecting lens.

A vehicle lamp such as a cornering lamp or a lamp unit of a headlamp is frequently arranged along a shape of a vehicle body of a vehicle. Therefore, it is preferable to promote a degree of freedom of layout of the lamp and promote design performance of the vehicle by forming a lens thereof by a surface shape along the shape of the vehicle body.

However, the vehicle lamps described in JP-A-2005-44683 and JP-UM-A-4-21005 use plane-convex lenses, and the vehicle lamp described in JP-A-2005-141918 uses a lens having a front surface of an ellipsoid shape. Therefore, none of these described lenses are formed along a shape-of the vehicle body. Thus, there is a problem that the lenses are insufficient in promoting degree of freedom of a layout of a lamp and of vehicular design.

Further, although the projecting lens of the lamp unit described in JP-A-2005-183090 is provided with a surface shape different from that of a normal projecting lens, the surface shape is provided with some degree of regularity and is not constituted by a surface shape in conformity with the shape of the vehicle body.

Further, even when the surface on the front side of the lens is formed by a freely formed curve surface in line with the shape of the vehicle body, a desired light distribution pattern cannot accurately be formed only by such a formed surface.

SUMMARY OF THE INVENTION

It is an object of the present invention to provide a vehicle lamp constituted to form a predetermined light distribution pattern by a light source and a lens arranged on a front side of the lamp, in which even when a surface on a front side of the lens includes a freely formed curve surface, a desired light distribution pattern can accurately be formed.

According to one aspect of the invention, a vehicle lamp includes: a light source; and a lens that is arranged on a front side of the light source, and deflects and irradiates light from the light source toward a front side of the vehicle lamp. A front side surface of the lens includes a first freely formed curve surface, and an irradiation angle of the light to be irradiated from the front side surface with respect to the optical axis is set as a target irradiation angle at each point of the front side surface. A rear side surface of the lens includes a second freely formed curve surface formed by continuous surface elements, each having an inclination angle that realizes a light irradiation by the target irradiation angle set at respective points of the front side surface.

According to another aspect of the invention, the vehicle lamp may further include an auxiliary reflector disposed on at least one of an upper side and a lower side of an optical axis, wherein the auxiliary reflector reflects and diffuses the light from the light source toward the front side of the vehicle lamp without being deflected by the lens.

The kind of vehicle lamp is not particularly limited. For example, a lamp unit of a cornering lamp, or a headlamp, a fog lamp or the like can be adopted.

The front and rear direction of the lamp may coincide with a front and rear direction of a vehicle or may not coincide therewith.

A kind of the light source is not particularly limited. For example, a light emitting chip of a light emitting element of a light emitting diode or a laser diode, a discharge light emitting portion of a discharge bulb, a filament of a halogen lamp or the like can be adopted. Further, as the light source, there can also be adopted such a primary light source as well as a secondary light source formed by converging light from the primary light source substantially to one point by a reflector, a lens or the like.

A specific shape of the first freely formed curve surface is not particularly limited, but for example, a curved surface formed flush with a surface of a vehicle body, or a curved surface formed at an equal interval from the curved surface or the like can be adopted.

A specific shape of a reflecting surface of the auxiliary reflector is not particularly limited so far as the auxiliary reflector is formed to reflect and diffuse light from a light source in a horizontal direction. Further, also with regard to a position of providing the auxiliary reflector, a specific position thereof is not limited so far as the position is a position capable of reflecting light from a light source toward the front side of the vehicle lamp without transmitting through the lens from at least one of the upper side and the lower side of the optical axis. Furthermore, "without being deflected by the lens" means that the light is not transmitted in a mode of undergoing light deflecting operation of the lens, and the light may be transmitted through a plain and transparent portion formed as a part of the lens or may be transmitted around the lens to thus avoid any refraction.

BRIEF DESCRIPTION OF THE DRAWINGS

FIG. 9 is a sectional view taken along a line IX-IX of

DESCRIPTION OF THE EXEMPLARY EMBODIMENTS

Exemplary embodiments of the invention will be described below with reference to the drawings.

Embodiment 1

Figure 1:
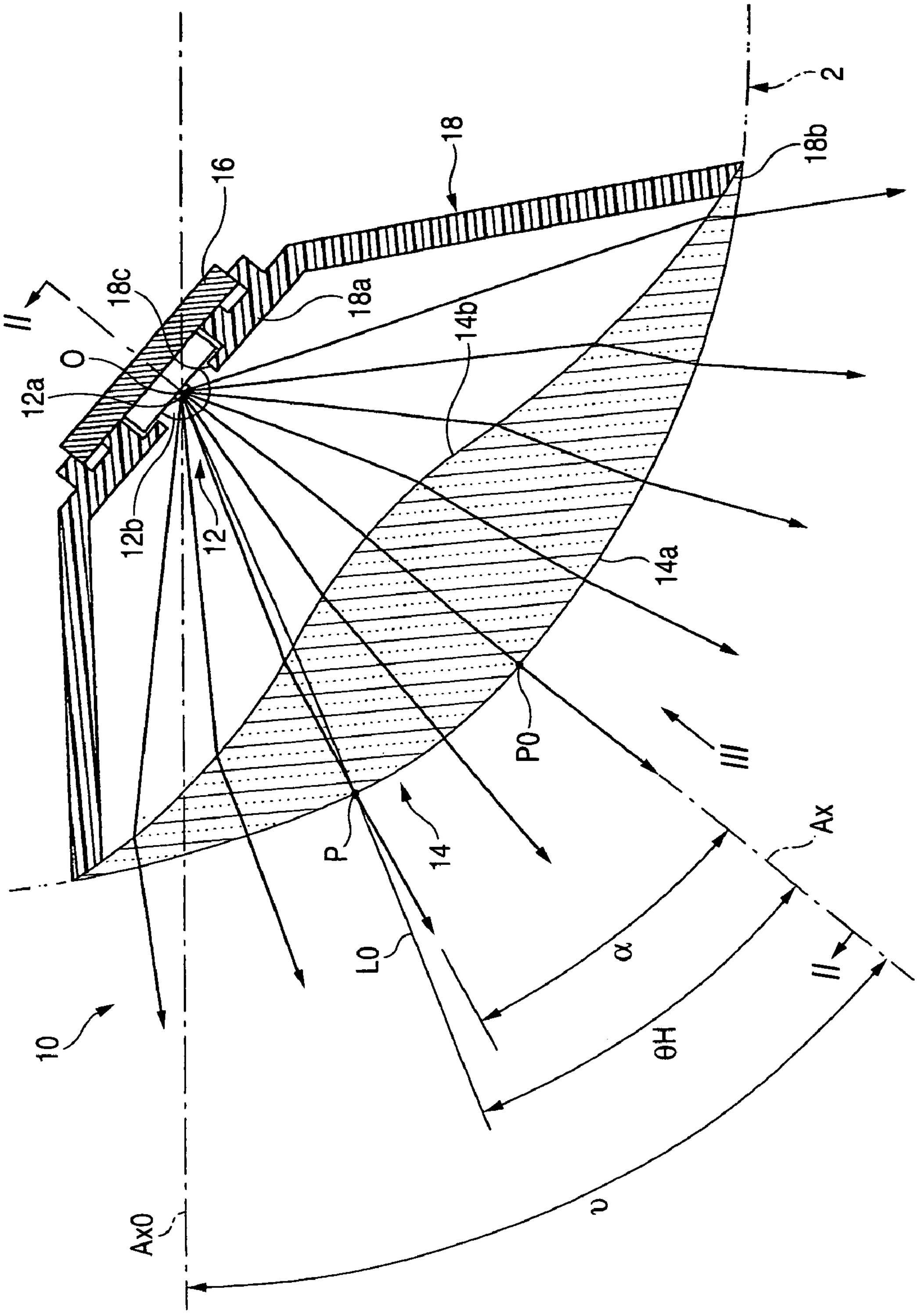
FIG. 1 is a plane sectional view showing a vehicle lamp according to a first exemplary embodiment of the invention.
Figure 2:
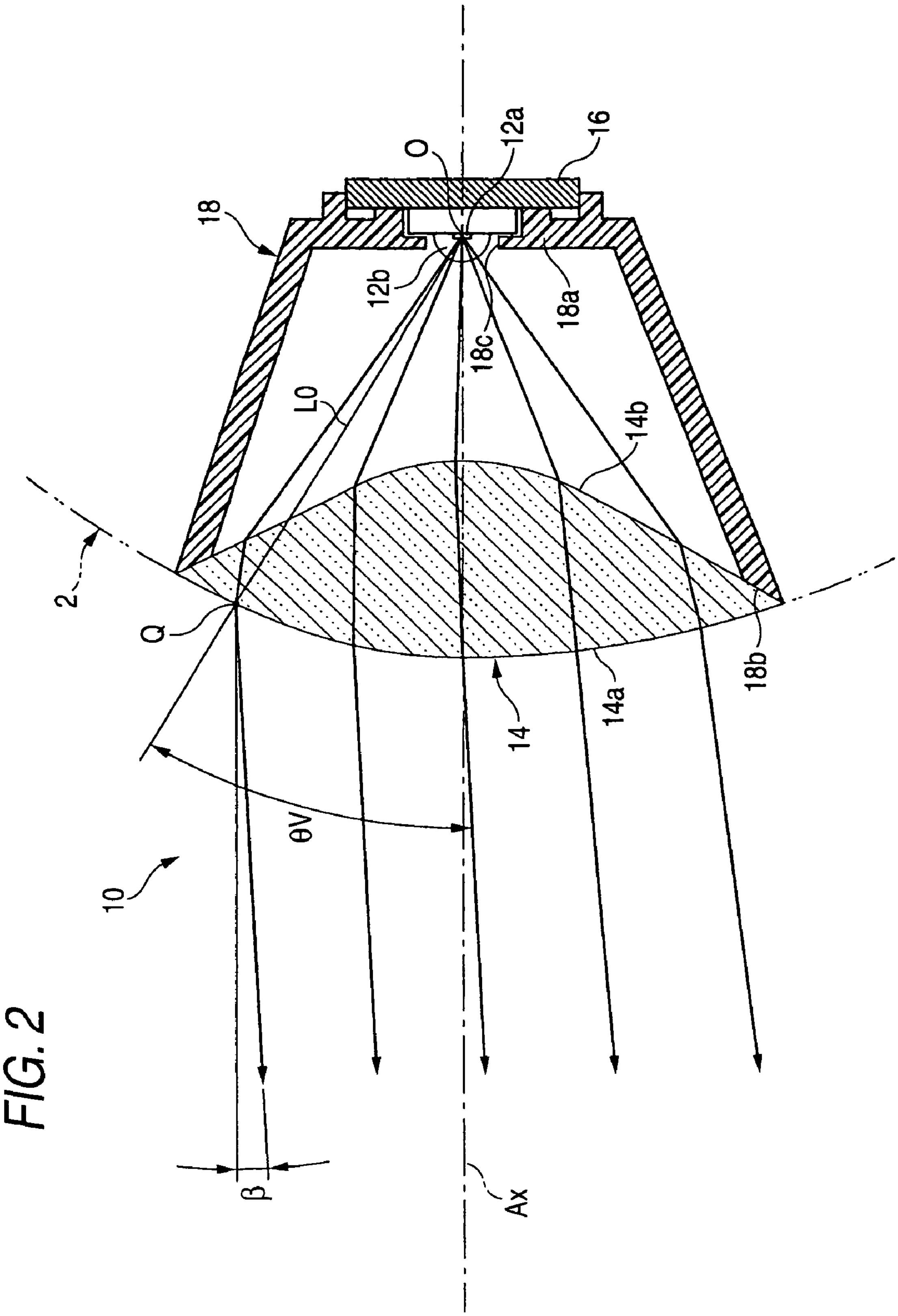
FIG. 2 is a sectional view taken along a line II-II of FIG. 1.
Figure 3:
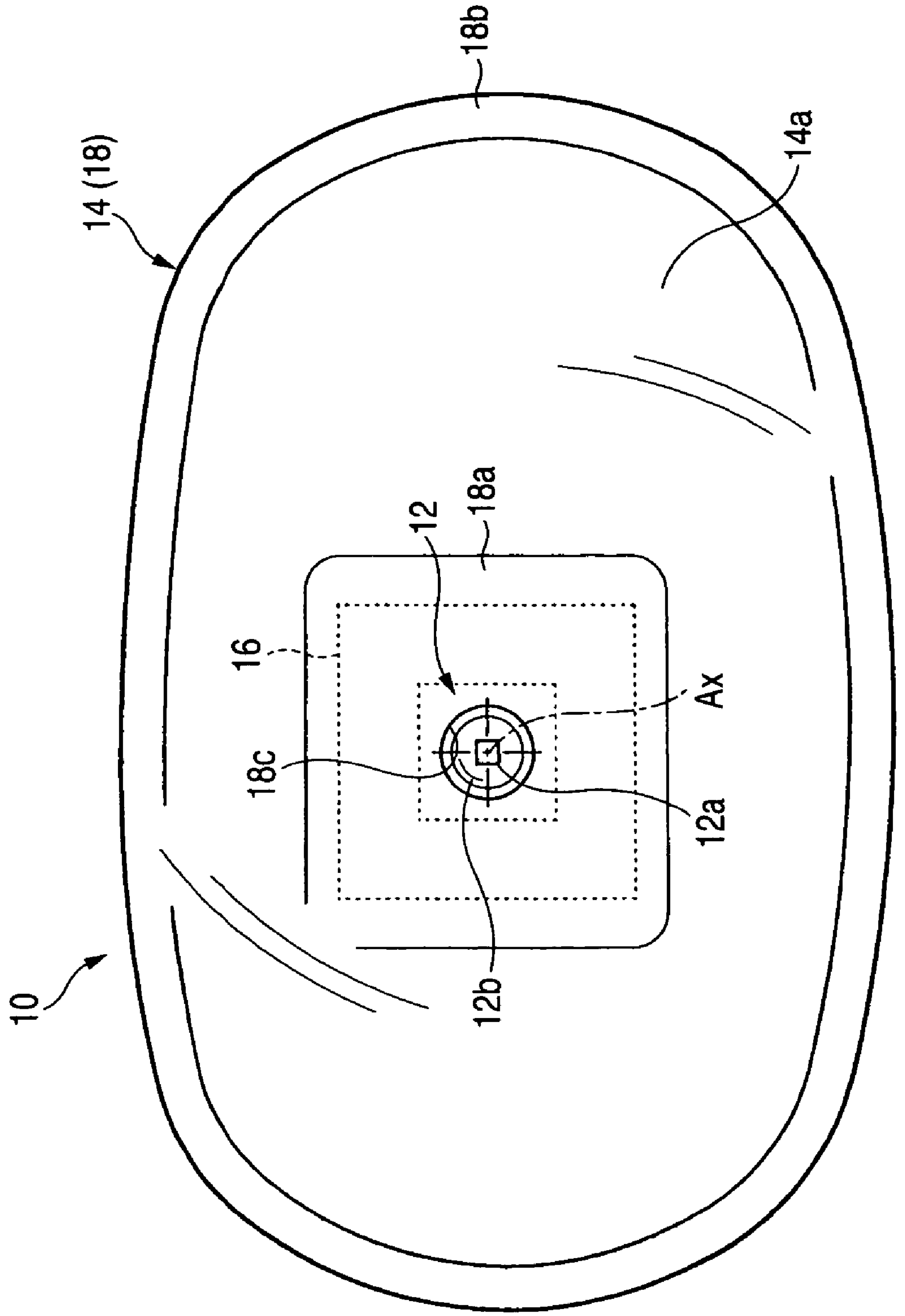
FIG. 3 is a view seen in a direction of an arrow mark III in FIG. 1.

FIG. 1 is the plane sectional view showing the vehicle lamp 10 according to the first exemplary embodiment, FIG. 2 is the sectional view taken along the line II-II of FIG. 1, and FIG. 3 is the view seen in the direction of the arrow mark III in FIG. 1.

As shown in FIGS. 1 to 3, the vehicle lamp 10 according to the first exemplary embodiment is a cornering lamp mounted to a left front end corner portion of a vehicle body 2, which illuminates a road surface on a left skewed front side of a vehicle when the vehicle is turned to run to a left side.

The vehicle lamp 10 includes a light emitting diode 12 arranged on an optical axis Ax extended in a direction inclined to an axis line Ax0 extended in a front and rear direction of the vehicle to an outer side in a vehicle width direction by a predetermined angle ν (specifically, about ν=50°), and a lens 14 arranged on a front side of the light emitting diode 12 (that is, front side in optical axis Ax direction) for deflecting and irradiating light from the light emitting diode 12 to the front side of the lamp 10.

The light emitting diode 12 is a white light emitting diode constituted by sealing a light emitting chip 12*a* of a square shape having a size of about 0.3 $mm^2$ to 3 $mm^2$ by a resin mold 12*b* substantially in a semispherical shape. The light emitting diode 12 is fixedly supported, by a support plate 16 made of a metal, in a state in which the light emitting chip 12*a* is arranged to direct emitted light to the front side of the lamp 10 on the optical axis Ax. The support plate 16 is positioned to be fixed to a rear face of a rear vertical face portion 18*a* of a holder 18 substantially in a cone-like shape expanded to the front side of the lamp 10. In this case, the support plate 16 is formed with a small circular hole 18*c* which is more or less larger than an outer diameter of the resin mold 12*b*, and the resin mold 12*b* is exposed from the small hole 18*c* to the front side of the lamp.

A front side surface 14*a* of the lens 14 includes a first freely formed curve surface extended flush with a surface of the vehicle body 2. In other words, the first freely formed curve surface is formed to correspond to the shape of the exterior of a vehicle. A rear side surface 14*b* of the lens 14 includes a second freely formed curve surface in accordance with the first freely formed curve surface (which will be described later). Further, the lens 14 is fixedly supported by the holder 18 in a state in which an outer peripheral edge portion of the rear side surface 14*b* is brought into contact with a front end face 18*b* of the holder 18.

Figure 4:
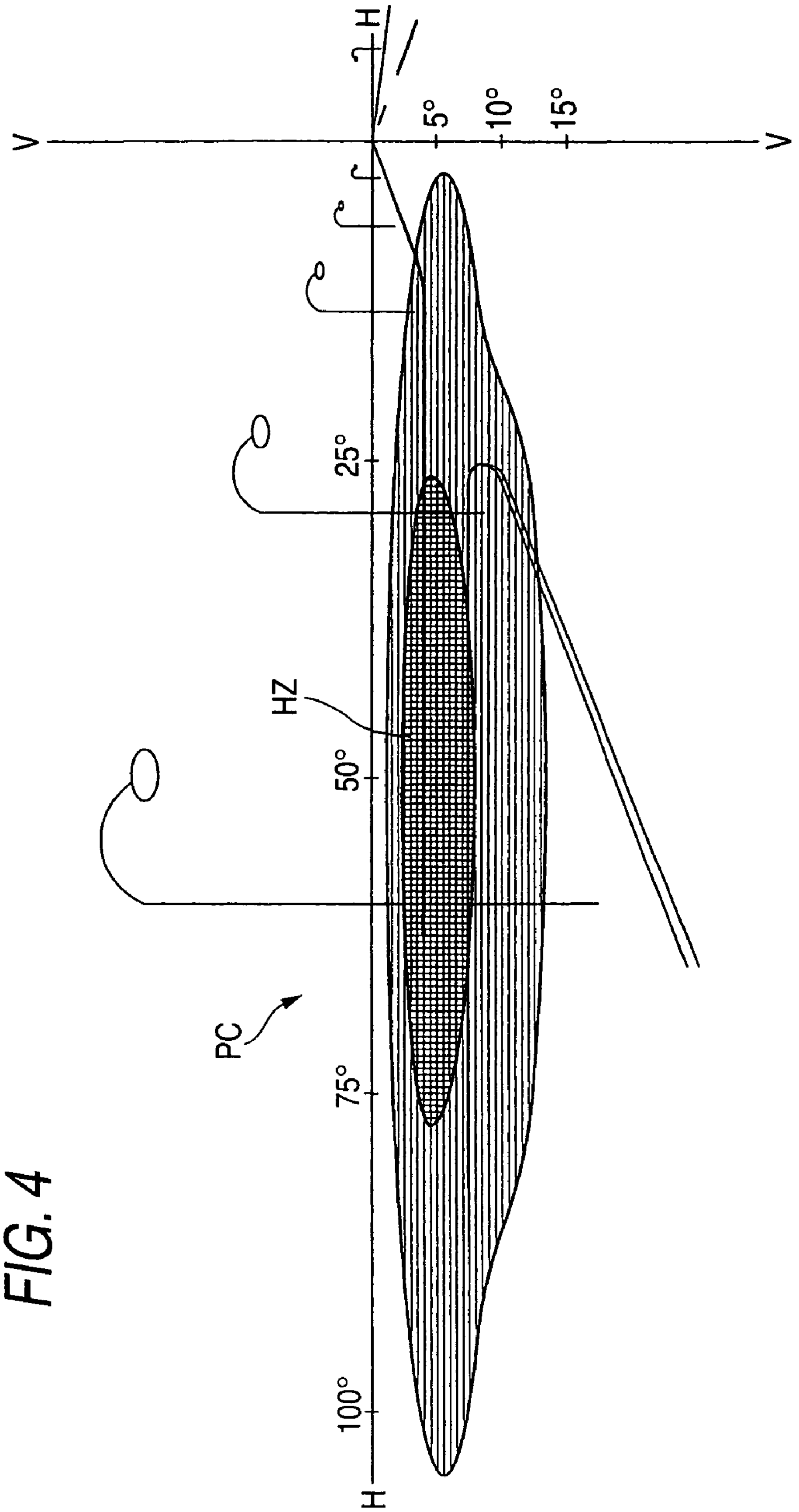
FIG. 4 is a diagram perspectively showing a transversely-prolonged light distribution pattern formed on an imaginary vertical screen arranged at a position 25 m in front of a vehicle by light irradiated from the vehicle lamp.

FIG. 4 is the diagram perspectively showing the transversely prolonged light distribution pattern PC formed on the imaginary vertical screen at a position 25 m in front of the vehicle by light irradiated in a front direction from the vehicle lamp 10 according to the first exemplary embodiment.

The transversely prolonged light distribution pattern PC is formed on a left side of a V-V line constituting a vertical line passing H-V, which constitutes a vanishing point in a direction of a front face of the vehicle of the axis line Ax0 extended in the front and rear direction of the vehicle. An upper end edge of the transversely prolonged light distribution pattern PC is also disposed slightly downward from an H-H line constituting a horizontal line passing H-V.

In this case, the transversely prolonged light distribution pattern PC is formed over a range from a vicinity of the V-V line to about 100° on a left side thereof centering on a direction of about 50° on a left side of the V-V line, and a hot zone HZ constituting a high luminous intensity region thereof is formed by a transversely-prolonged shape at a position substantially at a center in a left and right direction of the transversely-prolonged light distribution pattern PC and proximate to an upper end edge thereof.

In order to accurately form such a transversely-prolonged light distribution pattern PC, according to the first exemplary embodiment, a target irradiation angle is set for each point on the front side surface 14*a* of the lens 14. Further, the second freely formed curve surface constituting the rear side surface 14*b* is set to a shape of a curved surface for realizing light irradiation by the target irradiation angle.

The shape of the second freely formed curve surface is set by the following procedure.

First, as shown in FIGS. 1 and 2, an irradiation angle, with respect to the optical axis Ax, of light to be irradiated from the lens 14 is set as a target irradiation angle for each point on the front side surface 14*a*. The target irradiation angle is divided into a horizontal component and a vertical component and is set as a target irradiation angle α in a horizontal direction and a target irradiation angle β in a vertical direction.

Figure 5A:
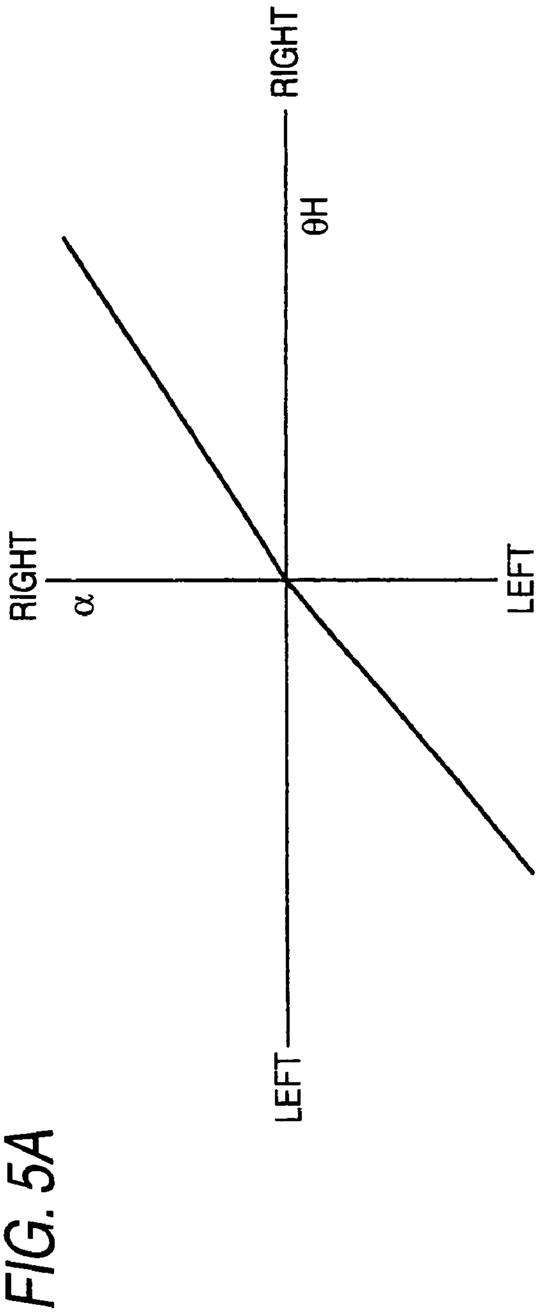
FIGS. 5A and 5B illustrate diagrams showing a target irradiation angle from each point on a front side surface of a lens of the vehicle lamp.

More specifically, as shown in FIG. 1, a horizontal component of an angle made by a linear line L0 and the optical axis Ax is set as a horizontal direction opening angle θH, and the target irradiation angle α in the horizontal direction is set in correspondence with the horizontal direction opening angle θH. The linear line L0 is a line connecting a point P on the front side surface 14a and a center O of light emission of the light emitting chip 12a. On the other hand, as shown in FIG. 2, a vertical component of an angle made by the linear line L0 and the optical axis Ax is set as a vertical direction opening angle θV, and the target irradiation angle β in the vertical direction is set in correspondence with the vertical direction opening angle θV. Here, the linear line L0 is a line connecting a point Q on the front side surface 14a and the center O of light emission of the light emitting chip 12a The target irradiation angle α in the horizontal direction is set to a value in accordance with a diffusion angle and a luminous intensity distribution in the horizontal direction of the transversely prolonged light distribution pattern PC. That is, as shown by the graph of FIG. 5A, in accordance with an increase in the horizontal direction opening angle θH, the target irradiation angle α is increased in a relationship which is substantially directly proportional thereto. In this situation, a diffusion angle in a horizontal direction of a portion of the transversely prolonged light distribution pattern PC disposed to the left side of the direction of the optical axis Ax (that is, a direction of about 50° to the left side of the V-V line) is slightly larger than a portion thereof disposed on a right side thereof, and therefore, a rate of change of the target irradiation angle α is set such that the target irradiation angle α in the left direction becomes a value slightly larger than a value of the target irradiation angle α in the right direction.

Figure 5B:
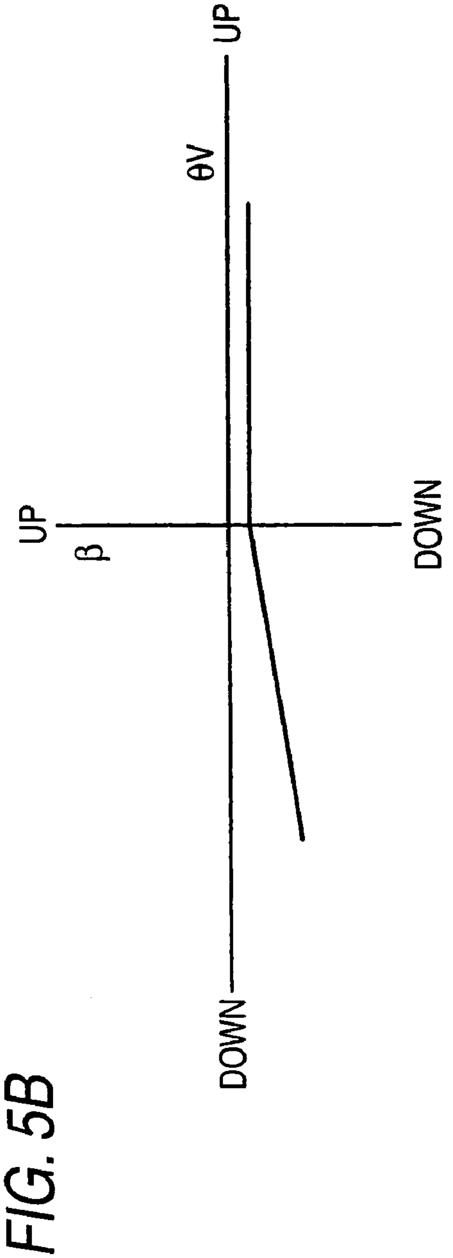

On the other hand, the target irradiation angle β in the vertical direction is set to a value in accordance with a diffusion angle and a luminous intensity distribution in the vertical direction of the transversely prolonged light distribution pattern PC. That is, as shown by the graph of FIG. 5B, on an upper side of the optical axis Ax, even when the vertical direction opening angle θV is increased, the target irradiation angle β is maintained at a negative small constant value. Thereby, light that is irradiated from the lens 14 becomes parallel light directed downward. Further, as shown by the same graph, on a lower side of the optical axis Ax, in accordance with an increase in the vertical direction opening angle θV, the target irradiation angle β is increased in a relationship substantially directly proportional thereto. However, a rate of change of the target irradiation angle β is set to a value comparatively smaller than the rate of change of the target irradiation angle α such that light to be irradiated from the lens 14 becomes light which diffuses slightly downward.

Next, the second freely formed curve surface constituting the rear side surface 14b of the lens 14 is formed. The second freely formed curve surface is formed by continuously forming surface elements, each having an inclination angle for realizing light irradiation at the target irradiation angle set to each corresponding point on the front side surface 14a.

Figure 6A:
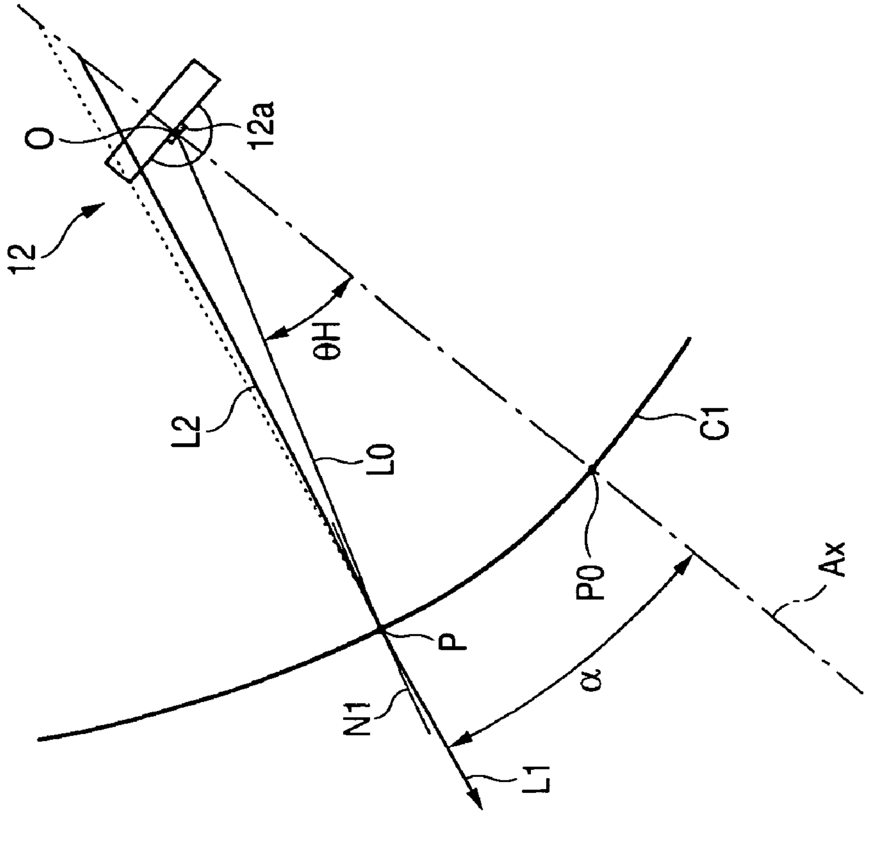
FIGS. 6A and 6B illustrate diagrams showing a procedure of forming a second freely formed curve surface constituting a rear side surface of the lens.
Figure 6B:
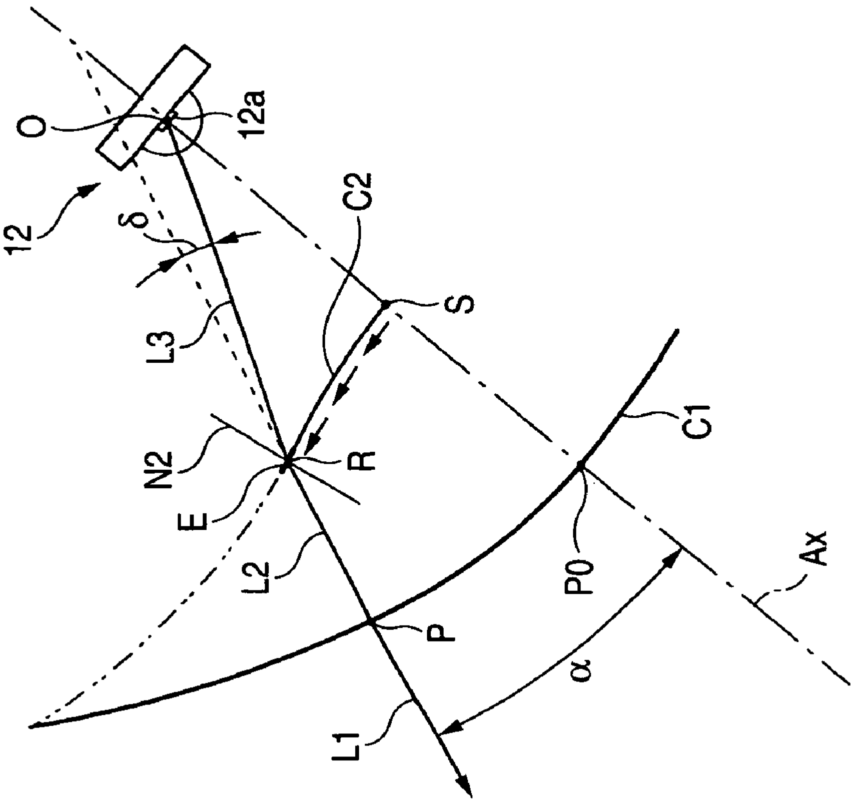

FIGS. 6A and 6B illustrate diagrams showing the procedure of forming the free curved line C2 constituting the horizontal sectional shape of the second freely formed curve surface.

First, as shown in FIG. 6A, there is calculated a direction of incidence of light to point P at the inside of the lens 14 necessary for irradiating light by the target irradiation angle α from point P on a free curved line C1 constituting the horizontal sectional shape of the front side surface 14a of the lens 14.

The front side surface 14a of the lens 14 is constituted by the first freely formed curve surface along the shape of the surface of the vehicle body 2, and therefore, a direction of a normal line N1 of the free curved line C1 at point P is already known. Hence, a direction of light incidence (direction indicated by linear line L2) to point P in correspondence with a direction of light irradiation from point P (direction indicated by L1) is calculated by using Snell's law.

Next, as shown in FIG. 6B, point R at which the free curved line C2 in the midst of being formed intersects with the linear line L2 and the center O of light emission of the light emitting chip 12a are connected by a linear line L3, and an angle δ made by the linear line L3 with the linear line L2 is calculated.

The free curved line C2 is formed by setting a starting point at point S on the optical axis Ax as will be described later. However, for convenience of explanation, it is assumed that the free curved line C2 is formed already up to a position of point R.

Next, a line element E of the free curved line C2 is allocated to point R. In this situation, a direction of a normal line N2 of the line element E is calculated by using Snell's law and an inclination angle of the line element E is also calculated simultaneously to achieve a refracting power of an amount of the angle δ in the line element E. Thereby, light emitted from the center O of light emission of the light emitting chip 12a is irradiated from the lens 14 to the front side of the lamp by an optical path formed by the linear line segments of L3-L2-L1.

Further, an inclination angle of a line element contiguous to a right side of the line element E is calculated by a procedure similar to that in the case of point P for a point contiguous to a right side of point P (that is, a side which is remote to the optical axis Ax) on the free curved line C1. In the following, by repeating a similar processing and continuously forming the series of line elements, a portion of the free curved line C2 disposed on the right side of the optical axis Ax is formed.

The free curved line C2 is formed by setting a point of reference point P0 disposed on the optical axis Ax in the free curved line C1. In this case, the starting point or start of S in forming the free curved line C2 is set on the optical axis Ax as a point corresponding with the point of reference P0, and a first line element allocated to the starting point S is orthogonal to the optical axis Ax at the starting point S. This is because the target irradiation angle α at the point of reference P0 is set to α=0° (see FIG. 1), thereby, the normal line L1 at the point of reference P0 of the free curved line C1 coincides with the optical axis Ax, and also the optical path of L3-L2-L1 also coincides with the optical axis Ax.

Further, the position of the starting point S in the front and rear direction on the optical axis Ax is set to a position remote to the point of reference P0 to a degree capable of forming the second freely formed curve surface over an entire region of the rear side surface 14b of the lens 14 and being as proximate as possible to the reference point P0 such that the lens 14 is not unnecessarily thick-walled.

Also, a portion of the free curved line C2 on a left side of the optical axis Ax in the free curved line C2 is formed by a similar procedure by designating the starting point at point S on the optical axis Ax.

Further, a free curved line constituting a horizontal sectional shape of the second freely formed curve surface is formed not only at a plane including the optical axis Ax but also in other respective planes that are in parallel with the plane including the optical axis and disposed on both upper and lower sides of the plane including the optical axis, by a procedure similar to the procedure of forming the free curved line C2.

Also a free curved line constituting a vertical sectional shape of the second freely formed curve surface constituting the rear side surface 14*b* of the lens 14 is formed by a procedure similar to the procedure of forming the free curved line C2. Further, the second free curved line is formed as an envelope surface of a plurality of free curved lines constituting horizontal sectional shapes thereof and a plurality of free curved lines constituting vertical sectional shapes thereof (that is, by continuously forming a plurality of surface elements arranged in a matrix by combining respective line elements of the plurality of free curved lines constituting the horizontal sectional shapes and respective elements of the plurality of free curved lines constituting the vertical sectional shapes).

As described above in detail, the vehicle lamp 10 according to the first exemplary embodiment is constituted to form the transversely prolonged light distribution pattern PC by deflecting and irradiating light from the light emitting diode 12, arranged on the optical axis Ax extended in the front end rear direction of the lamp to the front side of the lamp, by the lens 14 arranged on the front side of the lamp. The front side surface 14*a* of the lens 14 is constituted by the first freely formed curve surface, and therefore, the front side surface 14*a* can easily be formed by the shape along the surface shape of the vehicle body 2 (the shape of the curved surface extended substantially flush with the vehicle body 2 according to the first exemplary embodiment).

Further, the vehicle lamp 10 according to the first exemplary embodiment can accurately form the transversely prolonged light distribution pattern PC since the irradiation angle of light irradiated from the front side surface 14*a* of the lens 14 with respect to the optical axis Ax is set as the target irradiation angle for each point on the front side surface 4*a* in accordance with the shape and the luminous intensity distribution of the transversely prolonged light distribution pattern PC.

Further, the vehicle lamp 10 according to the first exemplary embodiment can provide the optical path necessary for irradiating the light without producing a stepped difference or the like at the rear side surface 14*b* since the rear side surface 14*b* of the lens 14 is constituted by the second freely formed curve surface constituted by continuously forming the surface elements having inclination angles for realizing light irradiation at the target irradiation angles set to respective points on the front side surface 14*a*.

In this way, the vehicle lamp 10 according to the first exemplary embodiment can form a desired transversely prolonged light distribution pattern PC, although the front side surface 14*a* of the lens 14 is constituted by the freely formed curve surface. Thereby, the degree of freedom of the layout of the lamp and vehicular design can be promoted.

Further, the lens 14 of the vehicle lamp 10 according to the first exemplary embodiment can promote an aesthetic look of the vehicle lamp 10 since both the front side surface 14*a* and the rear side surface 14*b* are constituted by the freely formed curve surfaces, thereby, a stepped difference or the like can be prevented from being formed on the surface of the lens 14.

Further, the vehicle lamp 10 according to the first exemplary embodiment can be compact since the light source is constituted by the light emitting chip 12*a* of the light emitting diode 12 and direct light from the light emitting chip 12*a* is constituted to be incident on the lens 14.

In this case, the light emitting diode 12 is arranged to expose only the resin mold 12*b* substantially in a semispherical shape for sealing the light emitting chip 12*a* from the small hole 18*c* formed at the rear vertical face portion 18*a* of the holder 18 to the front side of the lamp, and therefore, the design of the inside of a lamp chamber enlarged to be seen through the lens 14 can be improved.

Further, according to the first exemplary embodiment, an upper half portion of the lens 14 is constituted to irradiate light from the light emitting diode 12 as parallel light in the vertical direction, a lower half portion of the lens 14 is constituted to irradiate light from the light emitting diode 12 as light diffused downwardly in the vertical direction, and therefore, the transversely prolonged light distribution pattern PC can be formed to be bright at a vicinity of an upper end portion thereof and gradually darken towards a lower end portion thereof. Thereby, the road surface on the front side of the lamp can be illuminated by substantially uniform brightness from a short distance region to a long distance region, and optical recognizability of the road surface on the front side in the direction of the vehicle motion in turning the vehicle can further be promoted.

Embodiment 2

Figure 7:
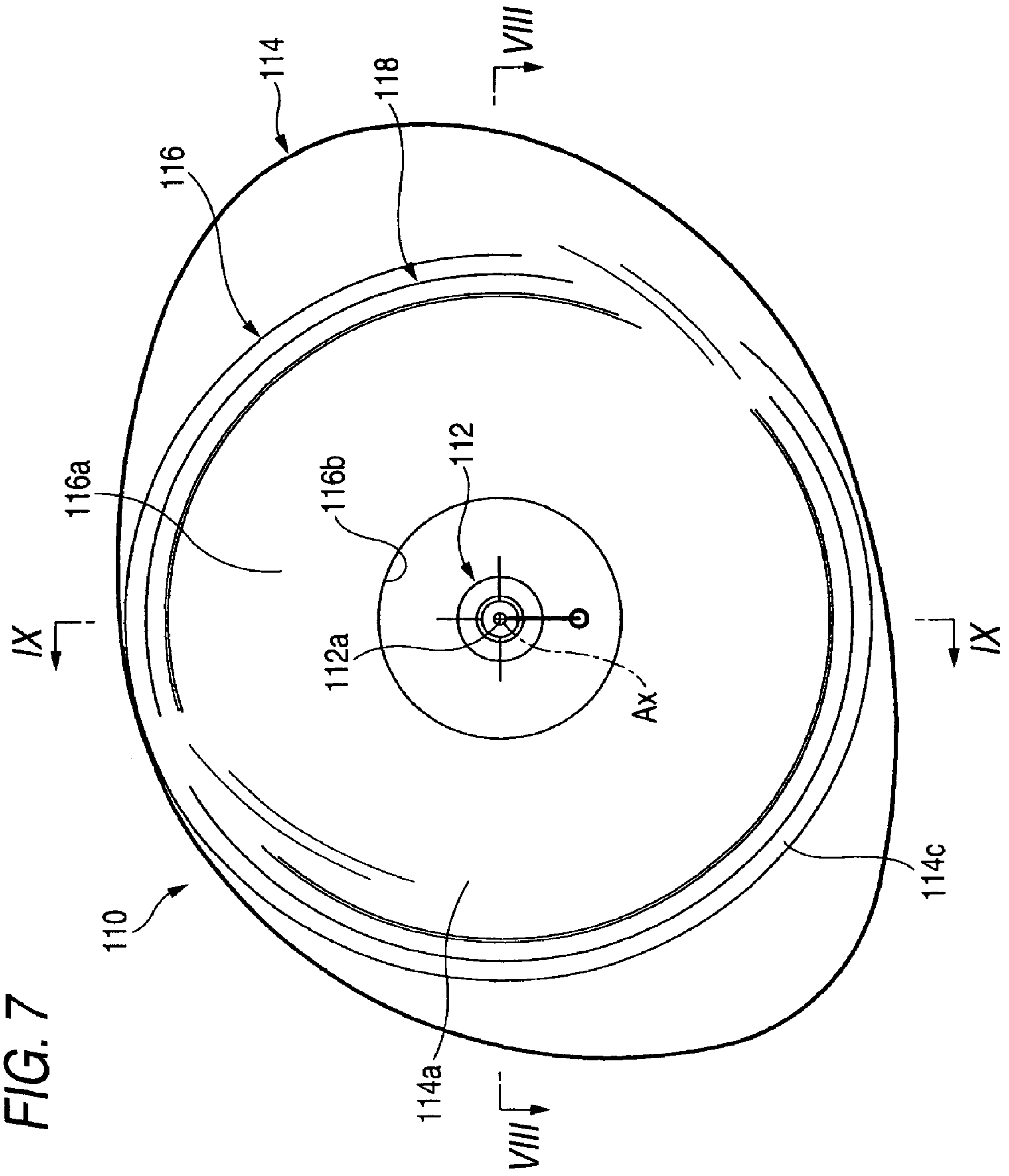
FIG. 7 is a front view showing a vehicle lamp according to a second exemplary embodiment of the invention.
Figure 8:
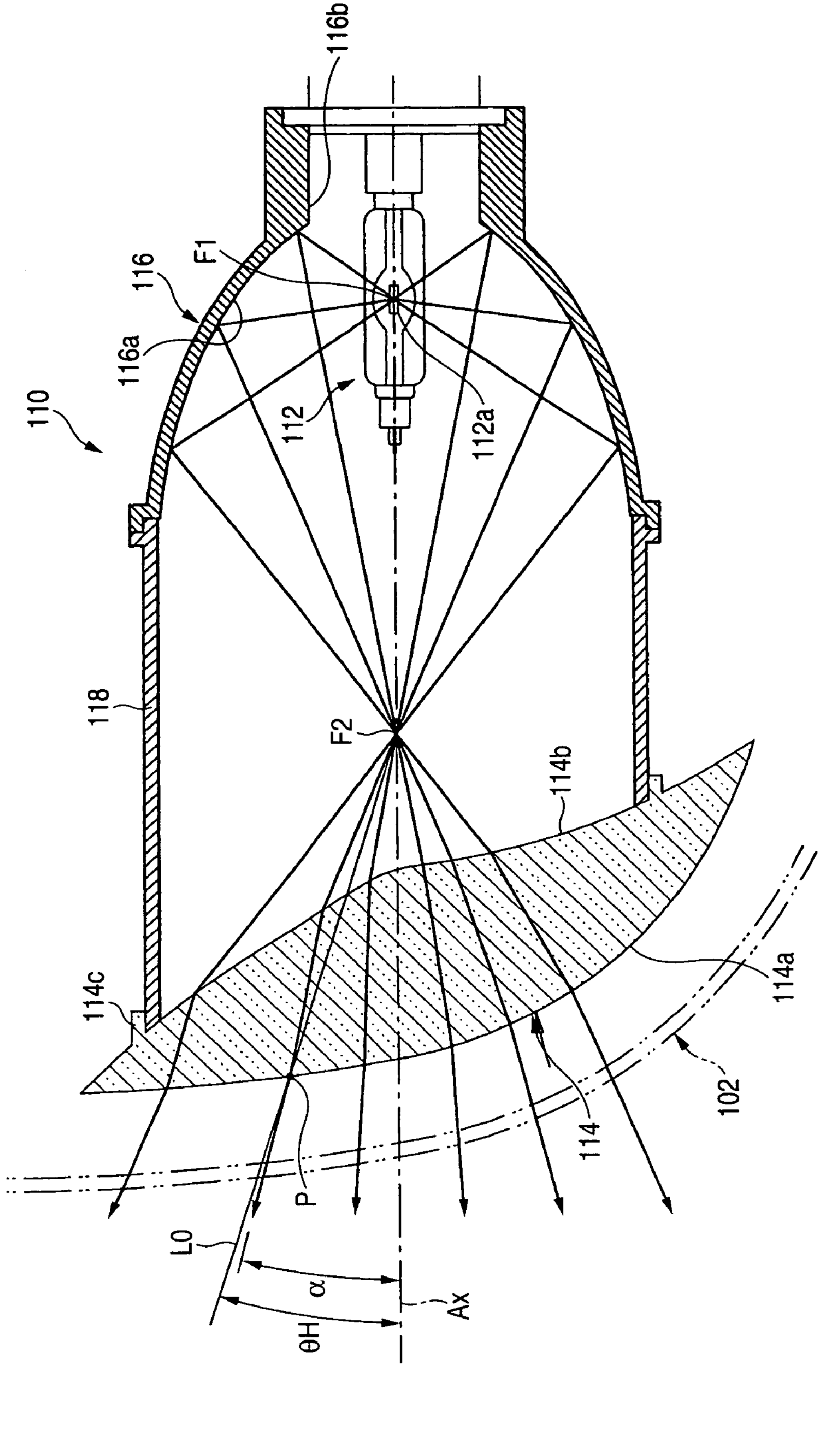
FIG. 8 is a sectional view taken along a line VIII-VIII of FIG. 7.
Figure 9:
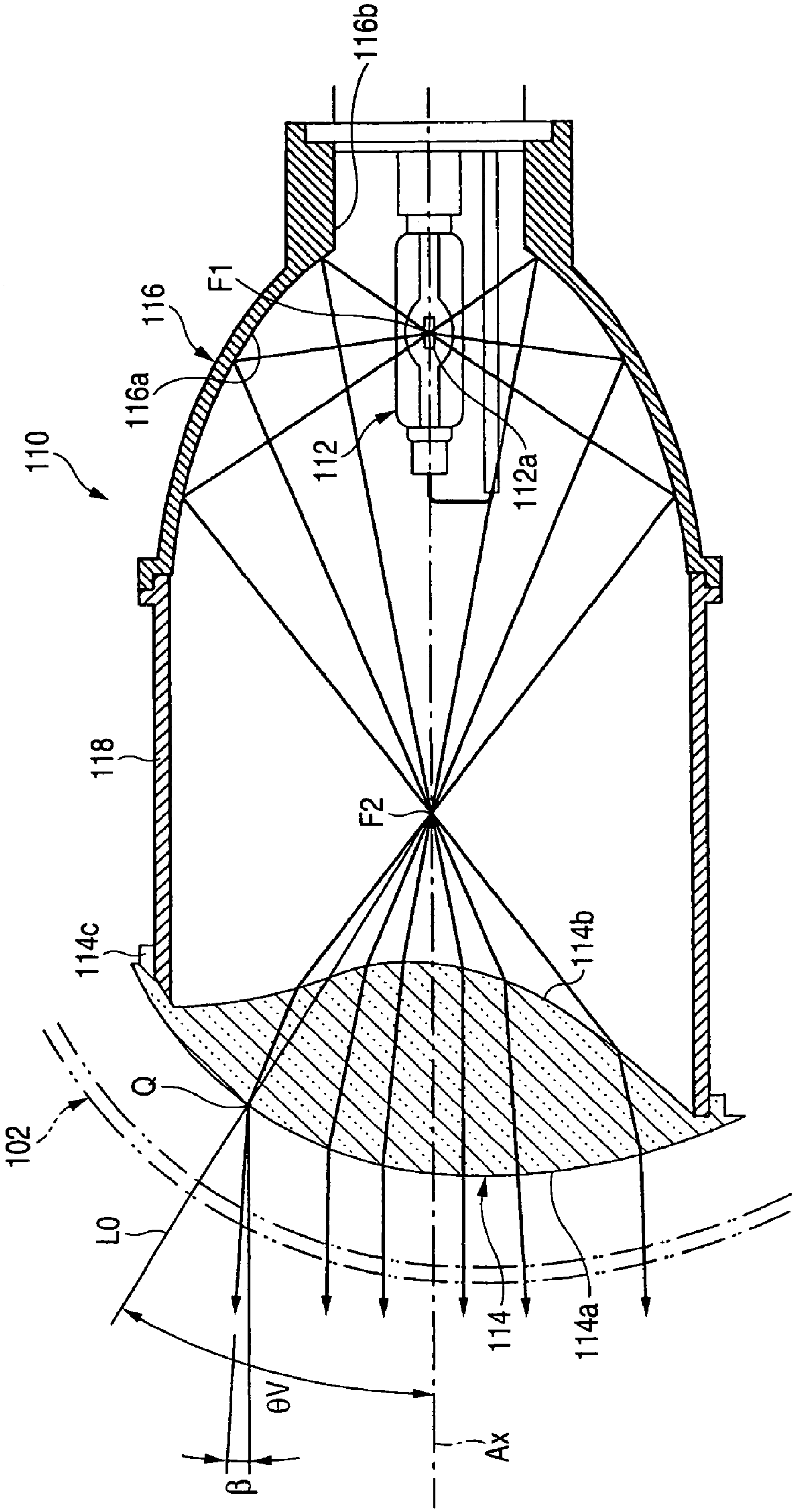

FIG. 7 is a front view showing the vehicle lamp 110 according to the second exemplary embodiment, FIG. 8 is a sectional view taken along the line VIII-VIII of FIG. 7, and FIG. 9 is a sectional view taken along the line IX-IX of FIG. 7.

As shown in FIGS. 7 to 9, the vehicle lamp 110 according to the second exemplary embodiment is a lamp unit integrated as a portion of a headlamp mounted to a left front end corner portion of a vehicle body to irradiate light for forming a high beam light distribution pattern. The headlamp includes a transparent cover 102 that is plain (does not deflect light) and extends flush with a surface of the vehicle body, and the vehicle lamp 110 is contained inside a lamp chamber constituted by the transparent cover 102 and a lamp body (which is not illustrated).

The vehicle lamp 110 is constituted by including a light source bulb 112 arranged on an optical axis Ax extended in a front and rear direction of a vehicle, a reflector 116 for reflecting light from the light source bulb 112 in a front direction to be proximate to the optical axis Ax, a lens 114 arranged on a front side of the reflector 116, and a holder 118 for connecting the lens 114 and the reflector 116.

The light source bulb 112 is a discharge bulb of a metal halide bulb or the like constituting a light source such as a discharge light emitting portion 112*a* and inserted to be attached to a rear top opening portion 116*b* of the reflector 116 from a rear side, and the discharge light emitting portion 112*a* is constituted as a line segment light source extended along the optical axis Ax.

The reflector 116 includes a reflecting surface 116*a* having a spheroidal shape, a center axis thereof being the optical axis Ax. In this case, a position of a first focal point F1 is set to a center of light emission of the discharge light emitting portion 112*a*, and a position of a second focal point F2 thereof is set to a front side of the first focal point F1. Further, the reflector 116 forms a secondary light source by reflecting light from the discharge light emitting portion 112*a* as a primary light source in the front direction to be proximate to the optical axis Ax to be converged to a position of a second focal point F2, and light from the secondary light source is made to be incident on the lens 114 as light diverged from the second focal point F2.

A front side surface 114*a* of the lens 114 includes a first freely formed curve surface extended along a vicinity of a rear side of the transparent cover 102 such that an interval between the first freely formed curve surface and the transparent cover 102 is kept substantially equal. A rear side surface 114*b* of the lens 114 includes a second freely formed curve surface which is formed in accordance with the first freely formed curve surface (which will be described later).

The lens 114 is fixedly supported by the holder 118 in a state in which a portion thereof proximate to an outer peripheral edge of the rear side surface 114*b* is brought into contact with a front end face of the holder 118. The portion of the lens 114 proximate to the outer peripheral edge of the rear side surface 114*b* is formed with a ring-like flange portion 114*c* for positioning the lens 114 to the holder 118.

The holder 118 is a member formed substantially in a shape of a circular cylinder arranged between the lens 114 and the reflector 116 and is fixedly supported by the reflector 116 at a rear end portion thereof to thereby position the lens 114 and the reflector 116 in the above-described positional relationship.

Figure 10:
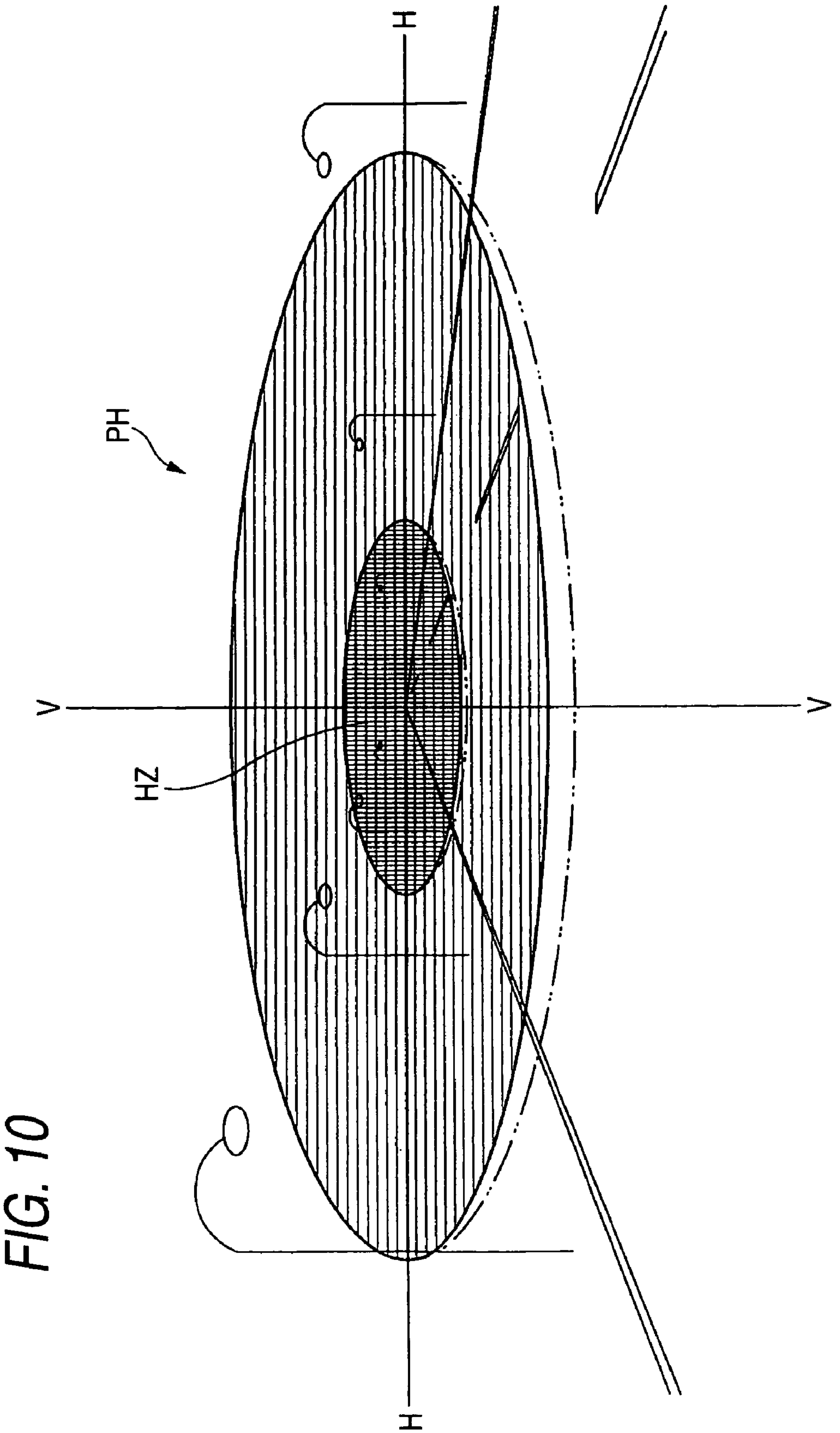
FIG. 10 is a diagram perspectively showing a high beam light distribution pattern formed on the imaginary vertical screen by light irradiated from the vehicle lamp according to the second exemplary embodiment.

FIG. 10 is a diagram perspectively showing a high beam light distribution pattern PH formed on an imaginary vertical screen arranged at a position 25 m in front of the vehicle by light irradiated from the vehicle lamp 110 according to the second exemplary embodiment.

The high beam light distribution pattern PH is formed as a light distribution pattern widely expanded in a left and right direction centering on H-V, and a hot zone HZ thereof is formed by a more or less laterally prolonged shape at a vicinity of H-V.

In order to accurately form the high beam light distribution pattern PH, according to the second exemplary embodiment, a target irradiation angle is set for each point on the front side surface 114*a* of the lens 114. Further, a second freely formed curve surface constituting the rear side surface 114*b* is set to a shape of a curved surface for realizing light irradiation by the target irradiation angle.

The shape of the second freely formed curve surface is set by the following procedure.

First, as shown in FIGS. 8 and 9, an irradiation angle, with respect to the optical axis Ax, of light to be irradiated from the lens 114 is set as a target irradiation angle for each point on the front side surface 114*a*. The target irradiation angle is divided into a horizontal component and a vertical component and is set as a target irradiation angle α in a horizontal direction and a target irradiation angle β in a vertical direction.

More specifically, as shown in FIG. 8, a horizontal component of an angle made by a linear line L0 and the optical axis Ax is set as a horizontal direction opening angle θH, and the target irradiation angle α in the horizontal direction is set in correspondence with the horizontal direction opening angle θH. The linear line L0 is a line connecting a point P on the front side surface 114*a* and the second focal point F2 which is a center of light emission of the secondary light source. On the other hand, as shown in FIG. 9, a vertical component of an angle made by a linear line L0 and the optical axis Ax is set as a vertical direction opening angle θV, and the target irradiation angle β in the vertical direction is set in correspondence with the vertical direction opening angle θV. The linear line L0 is a line connecting a point Q on the front side surface 114*a* and the second focal point F2

Figure 11A:
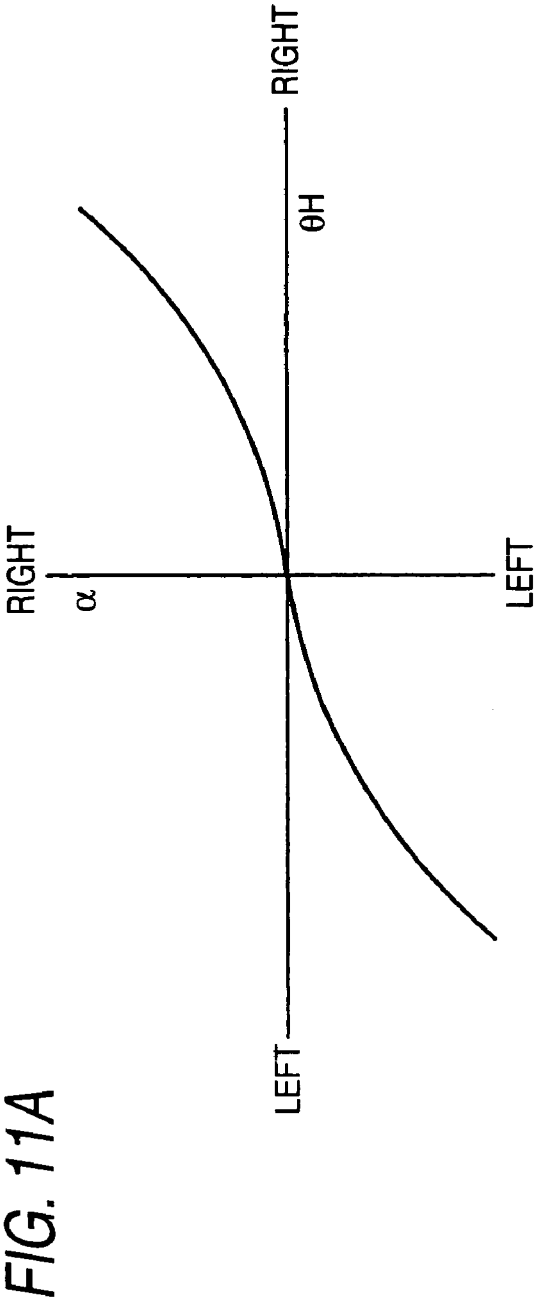
FIGS. 11A and 11B illustrate diagrams showing a target irradiation angle from each point on a front side surface of a lens of the vehicle lamp according to the second exemplary embodiment.

The target irradiation angle α in the horizontal direction is set to a value in accordance with a diffusion angle and a luminous intensity distribution in the horizontal direction of the high beam light distribution pattern PH. That is, as shown by a graph of FIG. 11A, the target irradiation angle α is increased in accordance with an increase in the horizontal direction opening angle θH. There is constituted a characteristic of changing the target irradiation angle α by a rate of change which is substantially the square of a rate of change of the horizontal direction opening angle θH to thereby make the hot zone HZ formed at a vicinity of H-V sufficiently bright.

Figure 11B:
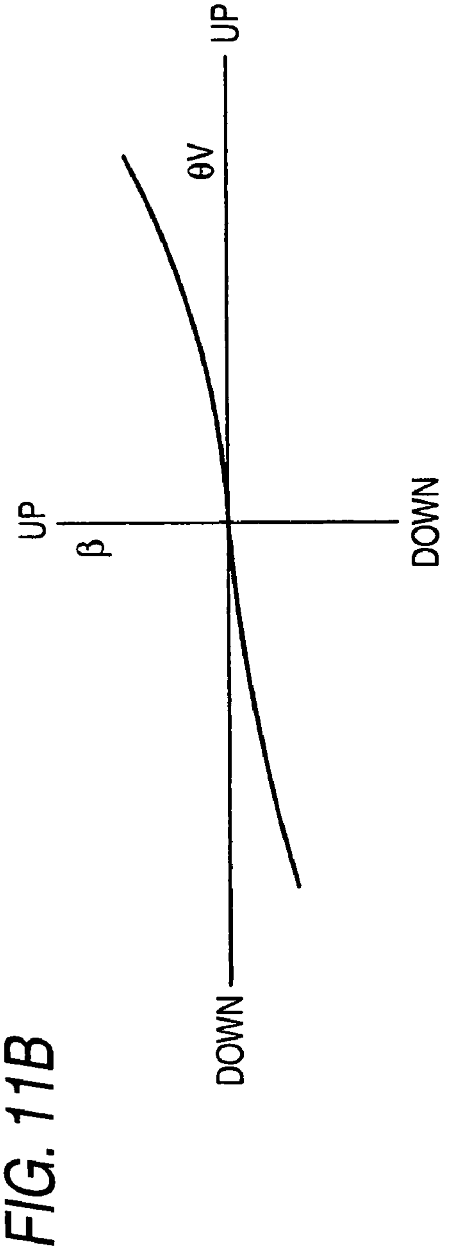

On the other hand, the target irradiation angle β in the vertical direction is set to a value in accordance with a diffusion angle and a luminous intensity distribution in the vertical direction of the high beam light distribution pattern PH. That is, as shown by the graph of FIG. 11B, the target irradiation angle β is increased in accordance with an increase in the vertical direction opening angle θV. In this situation, there is constituted a characteristic of changing the target irradiation angle β by a rate of change which is substantially the square of a rate of change of the vertical direction opening angle θV. Further, the rate of change of the target irradiation angle β is constituted by a value which is comparatively smaller than the rate of change of the target irradiation angle α. Thereby, the transversely prolonged hot zone HZ is formed. Further, on a lower side of the optical axis Ax, the rate of change of the target irradiation angle β is set to a value slightly smaller than that on an upper side thereof, thus a position of a lower end edge of the high beam light distribution pattern PH is displaced to be slightly proximate to the H-H line from a position indicated by a two-dotted chain line in FIG. 10. Remote optical recognizability is improved by preventing the short distance region of a road surface on the front side of the vehicle from being excessively bright.

Next, the second freely formed curve surface constituting the rear side surface 114*b* of the lens 114 is formed. The second freely formed curve surface is formed by continuously forming surface elements, each having an inclination angle for realizing light irradiation at the target irradiation angle set to each corresponding point on the front side surface 114*a*.

Figure 12A:
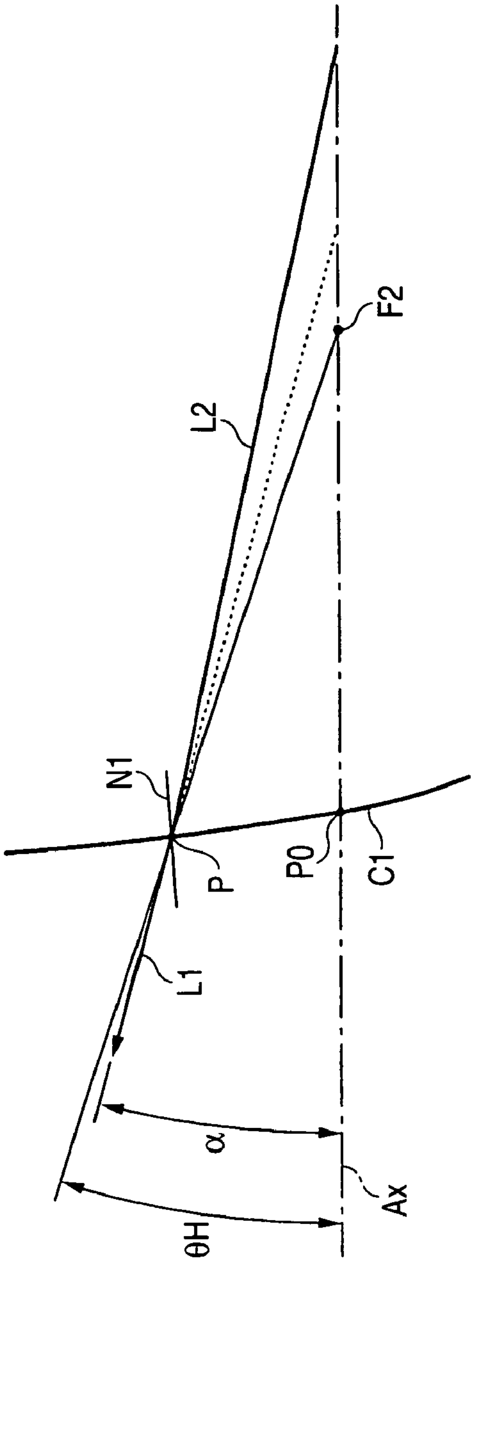
FIGS. 12A and 12B illustrate diagrams showing a procedure of forming a second freely formed curve surface constituting a rear side surface of the lens of the vehicle lamp according to the second exemplary embodiment.
Figure 12B:
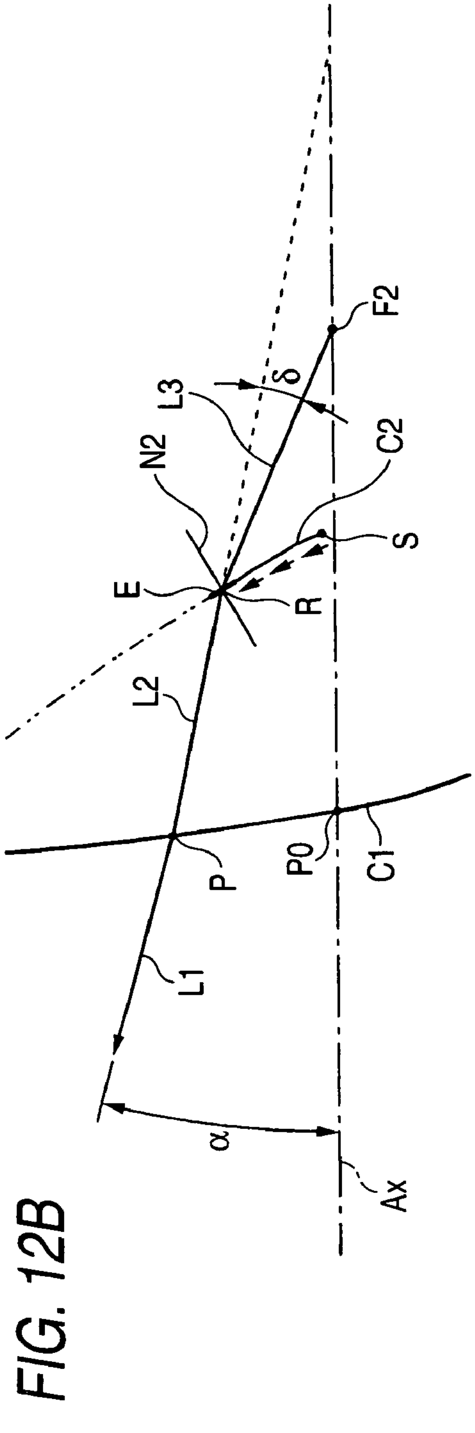

FIGS. 12A and 12B illustrate diagrams showing the procedure of forming the free curved line C2 constituting the horizontal sectional shape of the second freely formed curve surface.

First, as shown in FIG. 12A, there is calculated a direction of incidence of light to point P at the inside of the lens 114 necessary for irradiating light by the target irradiation angle α from point P on a free curved line C1 constituting the horizontal sectional shape of the front side surface 114*a* of the lens 114.

The front side surface 114*a* of the lens 114 is constituted by the first freely formed curve surface formed flush along the surface of the vehicle body, and therefore, a direction of a normal line N1 of the free curved line C1 at point P is already known. Hence, a direction of light incidence (direction indicated by linear line L2) to point P in correspondence with a direction of light irradiation from point P (direction indicated by L1) is calculated by using Snell's law.

Next, as shown in FIG. 12B, point R at which the free curved line C2 in the midst of being formed intersects with the linear line L2 and the second focal point F2 are connected by a linear line L3, and an angle δ made by the linear line L3 with the linear line L2 is calculated.

The free curved line C2 is formed by setting a starting point at point S on the optical axis Ax as will be-described later. However, for convenience of explanation, it is assumed that the free curved line C2 is formed already up to a position of point R.

Next, a line element E of the free curved line C2 is allocated to point R. In this situation, a direction of a normal line N2 of the line element E is calculated by using Snell's law and an inclination angle of the line element E is also calculated simultaneously to achieve a refracting power of an amount of the angle δ in the line element E. Thereby, light emitted from the second focal point F2 as the center of the second light source is irradiated from the lens 114 to the front side of the lamp by an optical path of L3-L2-L1.

Further, an inclination angle of a line element contiguous to a right side of the line element E is calculated by a procedure similar to that in the case of point P for a point contiguous to a right side of point P (that is, a side which is remote to the optical axis Ax) on the free curved line C1. By repeating a similar process and continuously forming the series of line elements, a portion of the free curved line C2 disposed on the right side of the optical axis Ax is formed.

The free curved line C2 is formed by setting a point of reference by point P0 disposed on the optical axis Ax in the free curved line C1. In this case, the starting point S in forming the free curved line C2 is set on the optical axis Ax as a point in correspondence with the point of reference P0. The position of the starting point S in the front and rear direction on the optical axis Ax is set to a position which is remote to the point of reference P0 to a degree capable of forming the second freely formed curve surface over an entire region of the rear side surface 114*b* of the lens 114 and being as proximate as possible to the reference point P0 such that the lens 114 is not unnecessarily thick-walled.

Also, a portion of the free curved line C2 which is disposed on a left side of the optical axis Ax is formed by a similar procedure by designating the starting point as point S on the optical axis Ax.

Further, a free curved line constituting a horizontal sectional shape of the second freely formed curve surface is formed not only at a plane including the optical axis Ax but also in other respective planes that are in parallel with the plane including the optical axis, and are disposed on both upper and lower sides of the plane including the optical axis, by a procedure similar to the procedure of forming the free curved line C2.

A free curved line constituting a vertical sectional shape of the second freely formed curve surface which includes the rear side surface 14*b* of the lens 14 is formed by a procedure similar to the procedure of forming the free curved line C2. Further, the second free curved line is formed as an envelope surface of a plurality of free curved lines constituting horizontal sectional shapes thereof and a plurality of free curved lines constituting vertical sectional shapes thereof (that is, by continuously forming a plurality of surface elements arranged in a matrix by combining respective line elements of the plurality of free curved lines constituting the horizontal sectional shapes and respective elements of the plurality of free curved lines constituting the vertical sectional shapes).

As described above in details, the vehicle lamp 110 according to the second exemplary embodiment is constituted to form the high beam light distribution pattern PH by deflecting and irradiating light from the light source bulb 112, arranged on the optical axis Ax extended in the front and rear direction of the lamp, toward the front side of the lamp by the lens 114 arranged on the front side of the lamp. The front side surface 114*a* of the lens 114 is constituted by the first freely formed curve surface, and therefore, the front side surface 114*a* can easily be formed to have the shape that extends along the shape of the vehicle body (according to the second exemplary embodiment, the shape of the front side surface 114*a* is the curved surface that extends along the transparent cover 102 such that an interval therebetween is kept equal, wherein the transparent cover 102 extends substantially flush with the surface of the vehicle body).

Further, according to the vehicle lamp 110 of the second exemplary embodiment, the irradiation angle, with respect to the optical axis Ax, of light irradiated from the front side surface 114*a* of the lens 114 is set as the target irradiation angle for each point on the front side surface 114*a* in accordance with a shape of the high beam light distribution pattern PH and the luminous intensity distribution. Therefore, the high beam light distribution pattern PH can accurately be formed.

Further, according to the vehicle lamp 110 of the second exemplary embodiment, the rear side surface 114*b* of the lens 114 includes the second freely formed curve surface formed by continuous surface elements, each having the inclination angle for realizing light irradiation at the target irradiation angles set for the respective points on the front side surface 114*a*. Therefore, the optical path necessary for the light irradiation can be provided without producing a stepped difference or the like at the rear side surface 114*b*.

In this way, according to the vehicle lamp 110 of the second exemplary embodiment, although the front side surface 114*a* of the lens 114 is constituted by the freely formed curve surface, a desired high beam light distribution pattern PH can be formed. Therefore, the degree of freedom of the layout of the lamp and the vehicular design can be promoted.

According to the lens 114 of the vehicle lamp 110 of the second exemplary embodiment, both the front side surface 114*a* and the rear side surface 114*b* includes the freely formed curve surfaces, thereby, a stepped difference or the like can be prevented from being formed at the surface of the lens 114. Therefore, the outlook of the vehicle lamp 110 can be promoted.

Further, the vehicle lamp 110 according to the second exemplary embodiment is constituted such that the reflector 116 having the reflecting surface 116*a* of a spheroidal shape reflects the light from the discharge light emitting portion 112*a*. The discharge light emitting portion 112*a* is the primary light source having the center of light irradiation at the first focal point F1 of the spheroidal shape. The reflector 116 converges the light to the second focal point F2 of the spheroidal shape, thereby, forming the secondary light source at a position of the second focal point F2. The light is then irradiated from the secondary light source toward the front side of the lamp by the lens 114. Therefore, in comparison with the case of arranging the discharge light emitting portion 112*a* at a position of the second focal point F2 and making light directly incident on the lens 114, a rate of utilizing light flux for light emitted from the discharge light emitting portion 112*a* can be promoted and a nonuniformity in brightness of the light source can be reduced. Therefore, the high beam light distribution pattern PH can be made to constitute a light distribution pattern which is brighter and provided with a smaller nonuiformity of light distribution.

The type of primary light source is not particularly limited. Further, a center axis of the spheroidal shape may be an axis line coinciding with the optical axis or may be an axis line which does not coincide therewith so far as light from the secondary light source falls in an angular range capable of being incident on the lens.

Embodiment 3

Figure 13:
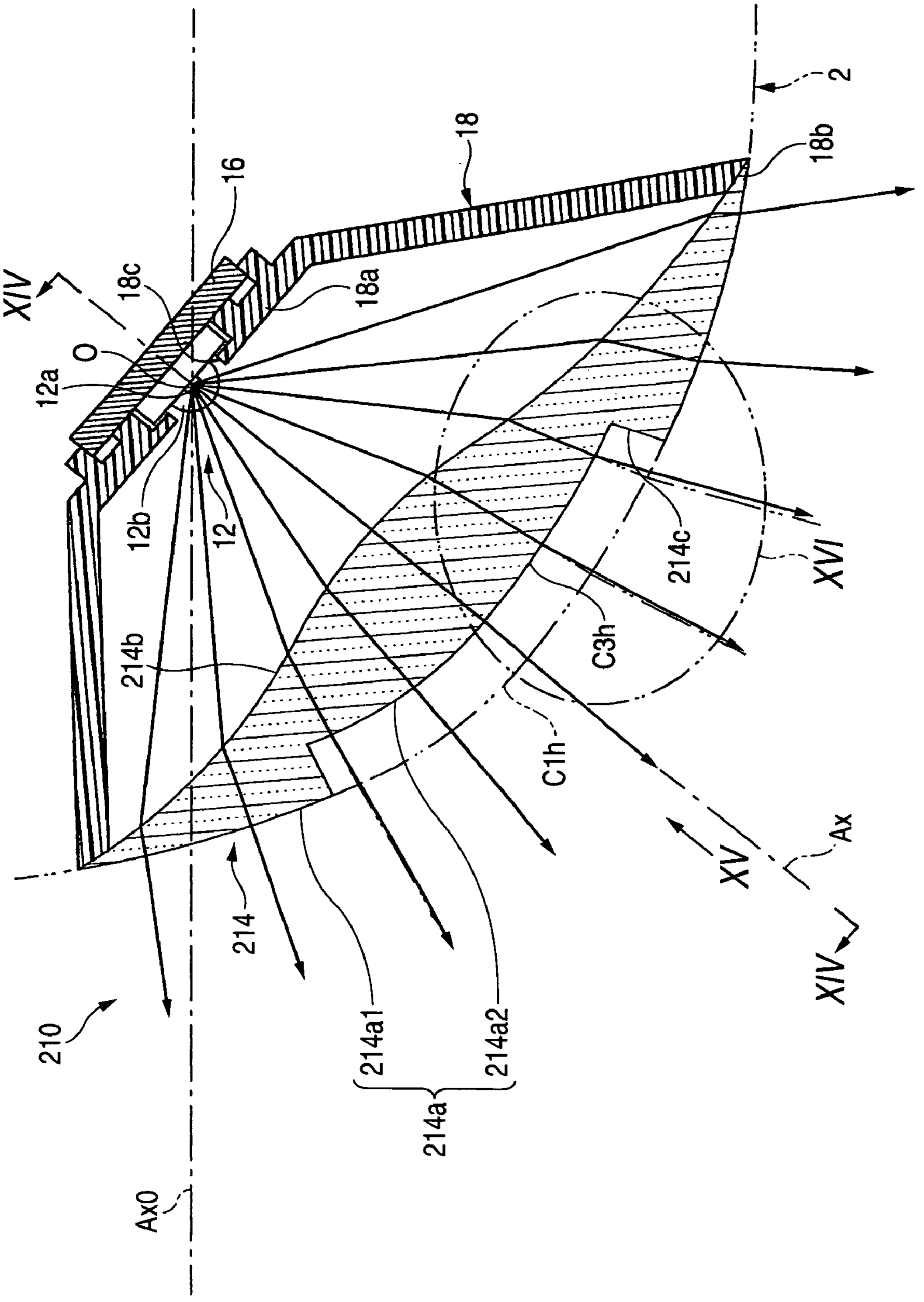
FIG. 13 is a plane sectional view showing a vehicle lamp according to a third exemplary embodiment of the invention.
Figure 14:
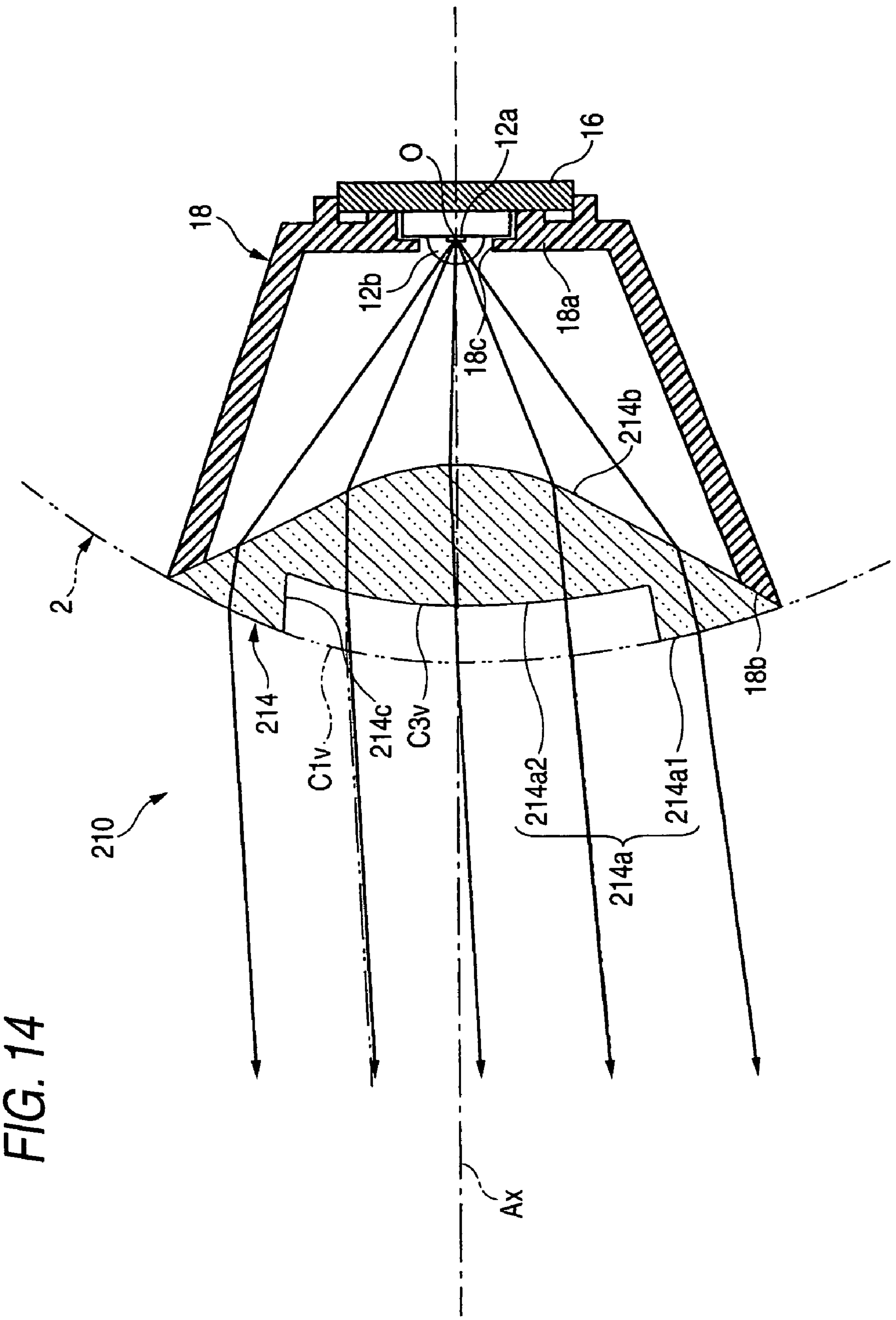
FIG. 14 is a sectional view taken along a line XIV-XIV of FIG. 13.
Figure 15:
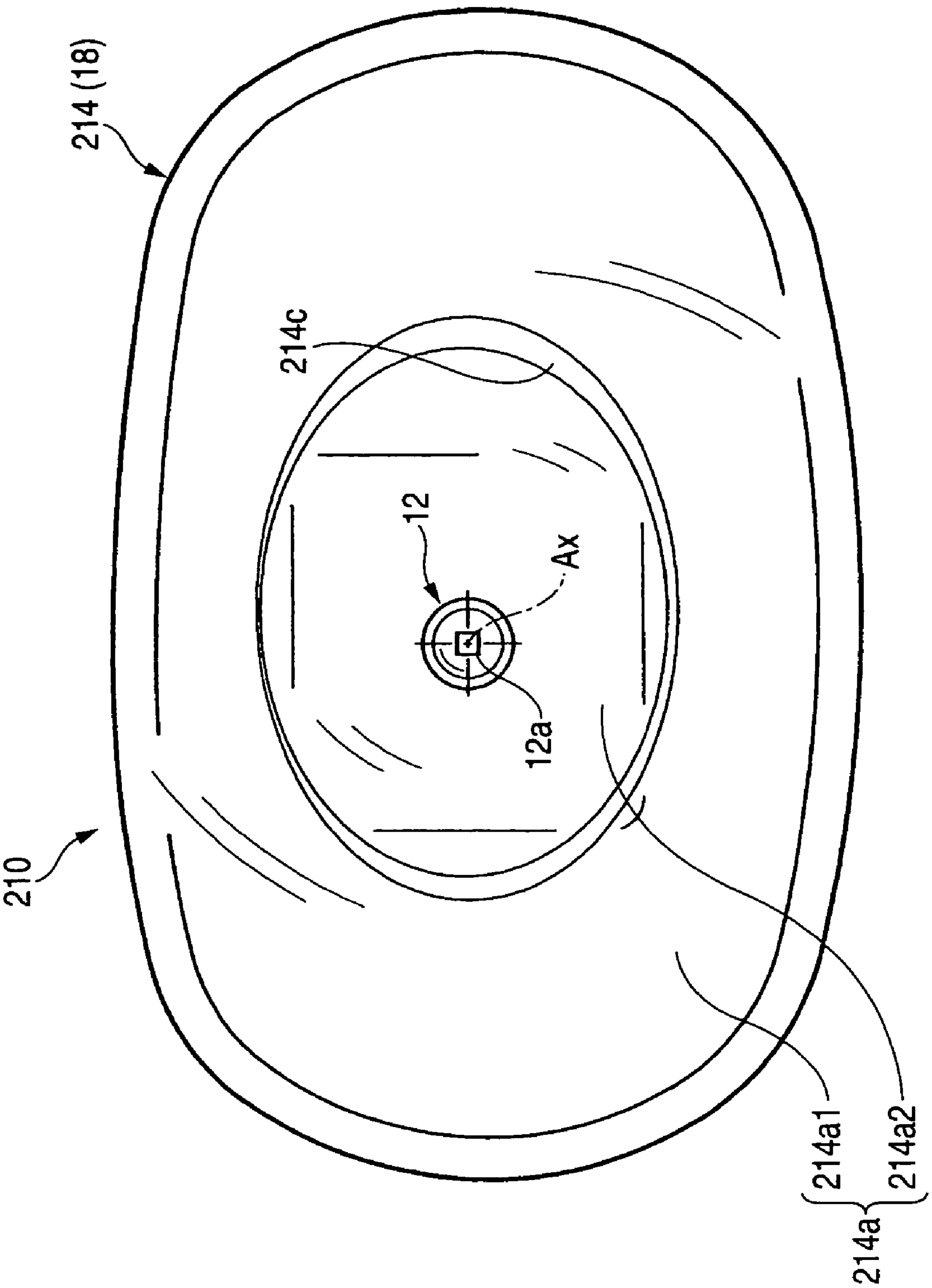
FIG. 15 is a view seen in a direction of an arrow mark XV in FIG. 13.

FIG. 13 is a plane sectional view showing a vehicle lamp 210 according to the third exemplary embodiment, FIG. 14 is a sectional view taken along the line XIV-XIV of FIG. 13, and FIG. 15 is a view seen in a direction of the arrow mark XV in FIG. 13.

As shown in FIGS. 13 to 15, although a basic constitution of the vehicle lamp 210 according to the third exemplary embodiment is similar to that in the case of the first exemplary embodiment, a constitution of the lens 214 partially differs from that of the case of the first exemplary embodiment.

That is, the lens 214 of the third exemplary embodiment is formed such that a center region 214*a*2 disposed at a vicinity of the optical axis Ax in a front side surface 214*a* thereof is displaced to a rear side from a general peripheral region 214*a*1 surrounding the center region 214*a*2.

More specifically, in the front side surface 214*a* of the lens 214, the general peripheral region 214*a*1 is constituted by a first freely formed curve surface (free curved lines C1*h*, C1*v* constituting a sectional shape thereof are shown in FIGS. 13 and 14) which is the same as the front side surface 14*a* of the lens 14 according to the first exemplary embodiment. The center region 214*a*2 includes a third freely formed curve surface (free curved lines C3*h*, C3*v* constituting a sectional shape thereof as shown by in FIGS. 13 and 14) formed substantially homothetic to the first freely formed curve surface, where the light emission center O of the light emitting diode 112 is the homothetic center. Further, the center region 214*a*2 and the general peripheral region 214*a*1 are connected by way of a ring-shaped wall surface 214*c*.

Further, a shape of a surface of the rear side face 214*b* of the lens 214 is quite similar to the shape of the surface of the rear side surface 14*b* of the lens 14 according to the first exemplary embodiment.

Figure 16:
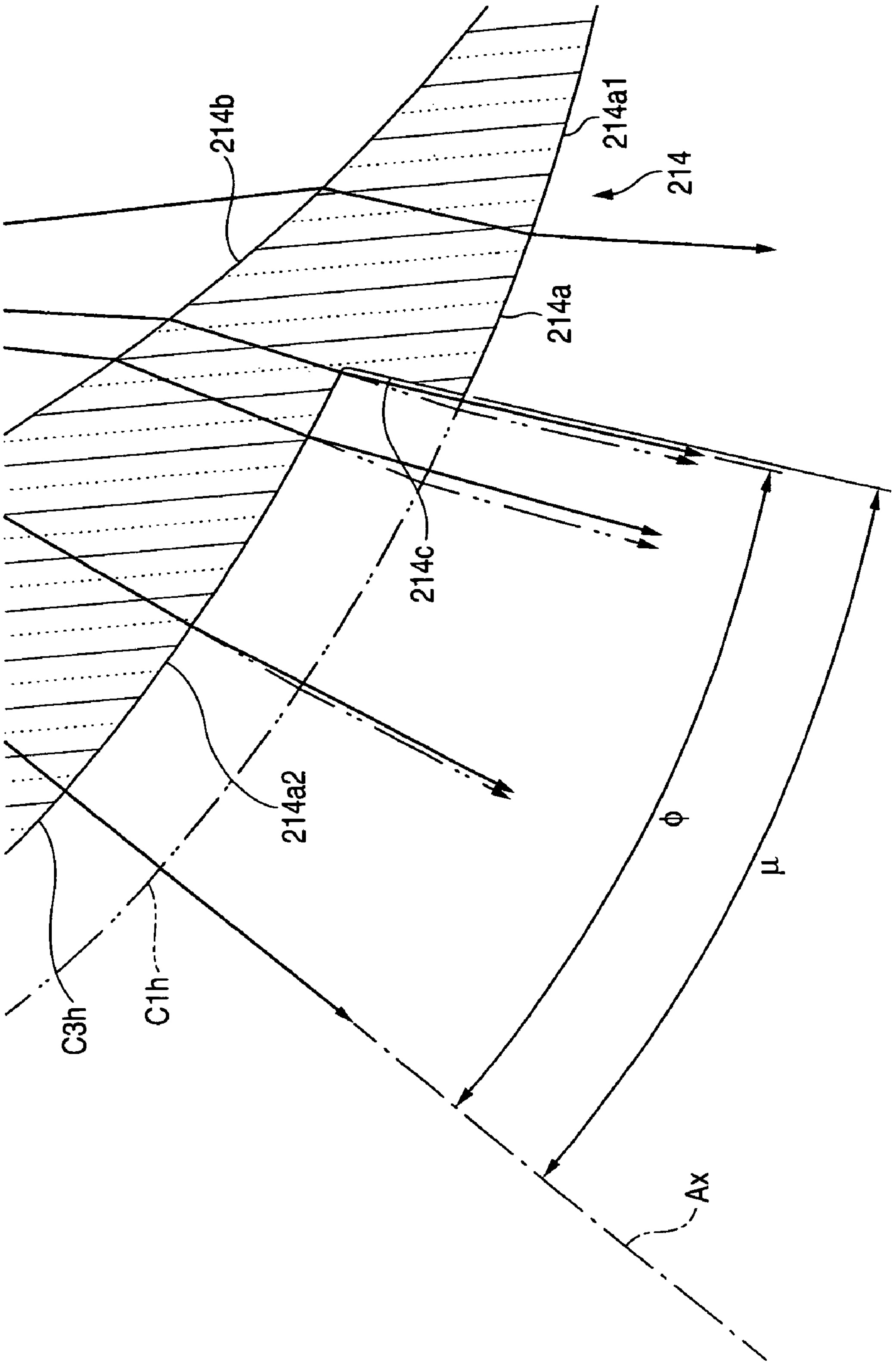
FIG. 16 is a detailed view of portion XVI of FIG. 13.

FIG. 16 is a detailed view of portion XVI in FIG. 13.

As shown also in FIG. 16, more precisely, the third freely formed curve surface constituting the center region 214*a*2 of the front side surface 214*a* of the lens 214 is a freely formed curve surface formed on the basis of the rear side surface 214*b* of the lens 214 such that light from the light emitting diode 12 incident on the rear side surface 214*b* of the lens 214 and arriving at each point of the center region 214*a*2 is irradiated in a direction (direction indicated by two-dotted chain lines in FIGS. 13 and 14) in which the light is irradiated also when the center region 214*a*2 is not formed and the general peripheral region 214*a*1 is extended along the first freely formed curve surface. The third freely formed curve surface formed in this way has a shape, as described above, that is substantially homothetic to the first freely formed curve surface having the light emission center O of the light emitting diode 12 as the homothetic center.

Further, as shown in FIG. 16, an inclination angle μ of the ring-shaped wall surface 214*c* within a plane including the optical axis Ax is set to a value substantially the same as that of an irradiation angle ϕ, with respect to the optical axis Ax, of light irradiated from an outer peripheral edge portion of the center region 214*a*2. Thus, the light to be irradiated from the center region 214*a*2 is presented beforehand from being incident again on the inside of the lens 214 from the ring-shaped wall surface 214*c* and being irradiated from the general peripheral region 214*a*1 in an unanticipated direction.

In this case, the irradiation angle ϕ is constituted by a value which differs respectively by positions of a plane including the optical axis Ax, and therefore, the inclination angle ϕ of the ring-shaped wall surface 214*c* is set to values which differ respectively from each other by positions in a peripheral direction of the ring-shaped wall surface 214*c*.

By adopting the constitution of the third exemplary embodiment, thinned formation and light-weighted formation of the lens 214 can be achieved. Further, an efficiency of transmitting light from the light emitting diode 12 can be promoted by an amount of being thinned.

Particularly, according to the lens 214 of the third exemplary embodiment, both the front side surface 214*a* and the rear side surface 214*b* include the freely formed curve surfaces. Therefore, it is preferable in view of ensuring face accuracy to constitute the lens 214 by a lens made of a synthetic resin. In such a case, when a wall thickness of the lens 214 is extremely thickened partially, a sink mark is liable to arise and it is difficult to ensure surface accuracy. In this respect, it can be prevented beforehand that the wall thickness of the lens 214 is extremely thickened partially when the center region 214*a*2 disposed at a vicinity of the optical axis Ax in the front side surface 214*a* is displaced to the rear side from the general peripheral region 214*a*1 as in the lens 214 of the third exemplary embodiment, thereby, the face accuracy can easily be ensured.

In this case, the third freely formed curve surface constituting the center region 214*a*2 is formed substantially homothetic to that of the first freely formed curve surface having the light emission center O of the light emitting diode 12 as the homothetic center. Therefore, light irradiated from each point of the center region 214*a*2 can be constituted by light directed in a direction substantially the same as that of the light irradiated from each point when the front side surface 214*a* of the lens 214 is constituted by the first freely formed curve surface over an entire region thereof.

Further, the inclination angle μ of the ring-shaped wall surface 214*c* in a plane including the optical axis Ax of the lens 214 is set to a value substantially the same as that of the irradiation angle ϕ, with respect to the optical axis Ax, of light irradiated from the outer peripheral edge portion of the center region 214*a*2 It can thus be prevented beforehand that a portion of light irradiated from the center region 214*a*2 is made incident again on the inside of the lens 214 from the ring-shaped wall surface 214*c* and is irradiated from the general peripheral region 214*a*1 in an unanticipated direction. Further, a light controlling function of the lens 214 it can effectively be restrained from deteriorating when the ring-shaped wall surface 214*c* is formed.

Further, by adopting the lens 214 of the third exemplary embodiment, a temperature rise at the inside of the lens 214 when the lamp is switched on can be restrained, which is preferable for the lens made of a synthetic resin which is inferior in heat resistance. According to the vehicle lamp 210 of the third exemplary embodiment, the light source is constituted by the light emitting diode 12, and therefore, the temperature rise at the inside of the lens 214 does not particularly pose a serious problem. However, when the light source is constituted by the light source bulb 112 as in the vehicle lamp 110 according to the second exemplary embodiment, a temperature rise at inside of the lens 114 is large and therefore, it is particularly effective to adopt a lens constitution as in the third exemplary embodiment for the lens 114.

Exemplary Embodiment 4

Figure 17:
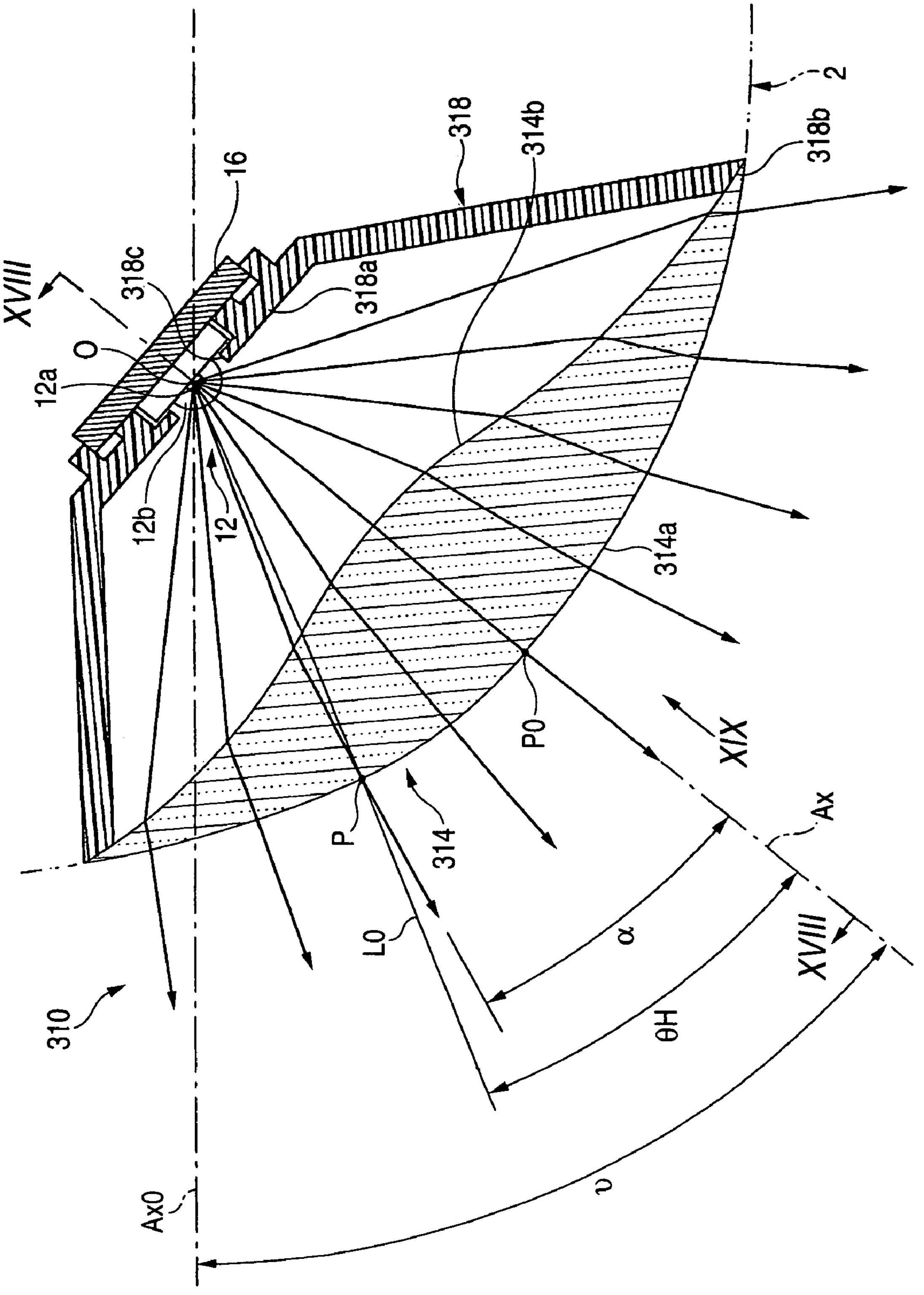
FIG. 17 is a plane sectional view showing a vehicle lamp according to a fourth exemplary embodiment of the invention.
Figure 18:
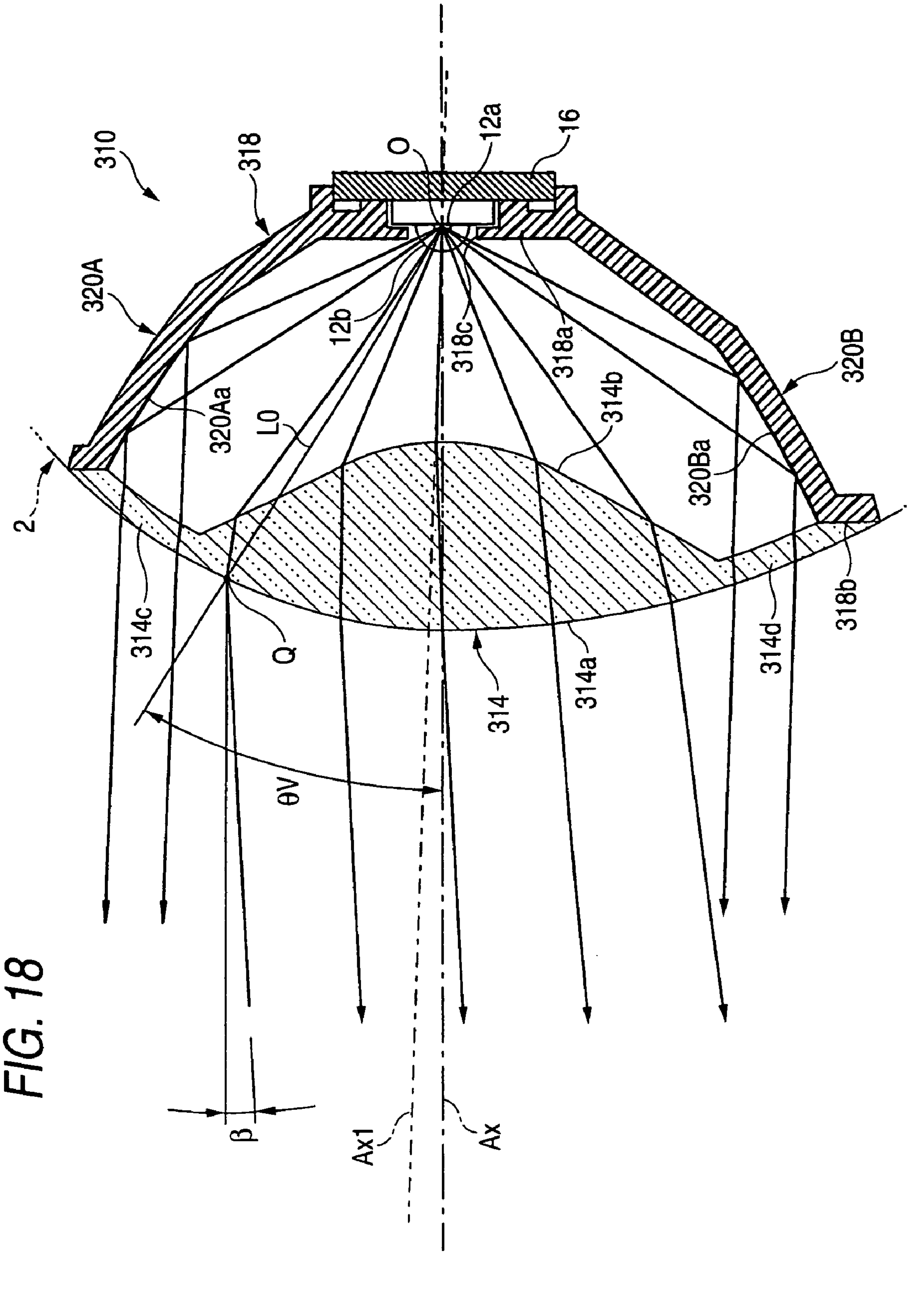
FIG. 18 is a vertical sectional view taken along a line XVIII-XVIII of FIG. 17.
Figure 19:
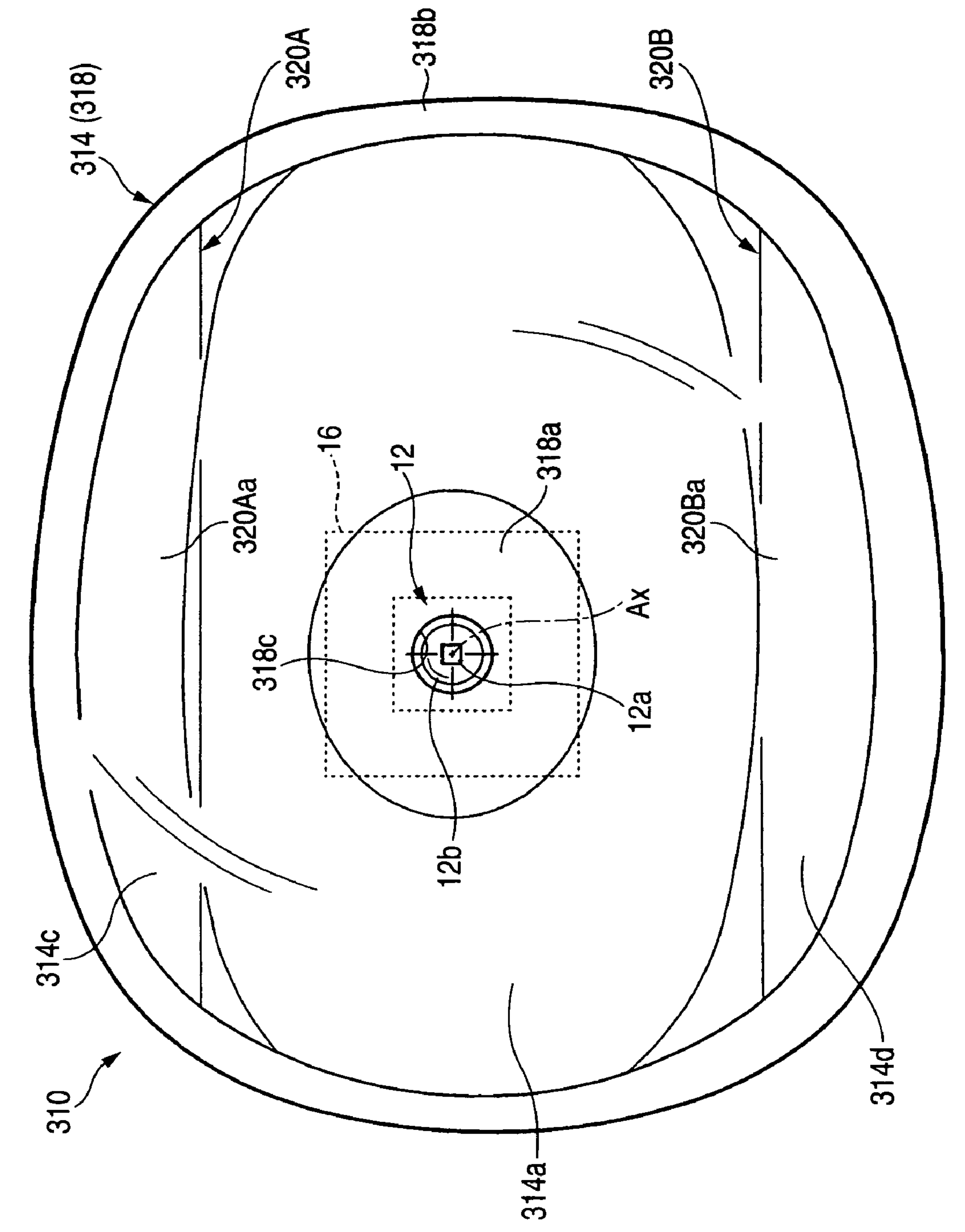
FIG. 19 is a view seen in a direction of arrow mark XIX in FIG. 17.

FIG. 17 is a plane sectional view showing the vehicle lamp 310 according to the fourth exemplary embodiment of the invention, FIG. 18 is a sectional view taken along the line XVIII-XVIII of FIG. 17, and FIG. 19 is a view seen in the direction of the arrow mark XIX in FIG. 17.

As shown in FIGS. 17 to 19, the vehicle lamp 310 according to the fourth exemplary embodiment is a cornering lamp mounted on a left front end corner portion of a vehicle body 2, and is switched on when a vehicle is turned to run to a left side in order to illuminate a road surface on a left skewed front side.

The vehicle lamp 310 is constituted by including a light emitting diode 12 arranged on an optical axis Ax extended in a direction of being inclined to an outer side in a vehicle width direction by a predetermined angle ν (specifically, about ν=50°) with respect to an axis line Ax0 extended in a front and rear direction of the vehicle, a lens 314 arranged on a front side of a lamp of the light emitting diode 12 (that is, front side in the optical axis Ax direction) for deflecting to emit light from the light emitting diode 12 to the front side of the lamp, and a pair of auxiliary reflectors 320A, 320B arranged on an upper side and a lower side of the optical axis Ax on a rear side of the lens 314.

A specific inclination angle of the optical axis is not particularly limited so far as the optical axis is extended in a direction of being inclined to an outer side in a vehicle width direction relative to a front and rear direction of the vehicle by a predetermined angle.

The light emitting diode 12 is a white light emitting diode constituted by sealing a light emitting chip 12*a* of a square shape having a size of about 0.3 $mm^2$ to 3 $mm^2$ by a resin mold 12*b* substantially in a semispherical shape, and is fixedly supported by a support plate 16 made of a metal in a state in which the light emitting chip 12*a* is arranged to be directed to the front side of the lamp on the optical axis Ax. The support plate 16 is positioned to be fixed to a rear face of a rear vertical face portion 318*a* of a holder 318 substantially in a cone-like shape expanded to the front side of the lamp. The support plate 16 is formed with a circular small hole 318*c* more or less larger than an outer diameter of the resin mold 12*b* The resin mold 12*b* is exposed from the small hole 318*c* to the front side of the lamp.

A front side surface 314*a* of the lens 314 includes a first freely formed curve surface extended flush with a surface of the vehicle body 2, and a rear side surface 314*b* of the lens 314 includes a second freely formed curve surface in accordance with the first freely formed curve surface. Further, the lens 314 is fixedly supported by the holder 318 in a state in which an outer peripheral edge portion of the rear side surface 314*b* is brought into contact with a front end face 318*b* of the holder 318. In this case, both upper and lower end portions of the lens 314 are extended to be formed with transparent portions 314*c*, 314*d* for hermetically closing a space between the lens 314 and the holder 318. The respective transparent portions 314*c*, 314*d* are formed by a constant wall thickness to be extended flush with a front side surface 314*a* and are brought into contact with the front end face of the holder 318 at an outer peripheral edge portion thereof.

The auxiliary reflector 320A disposed on an upper side of the optical axis Ax is constituted integrally with the holder 318 by forming a reflecting surface 320Aa by subjecting a transversely prolonged bow shape region of an upper portion of a front face of the holder 318 to a mirror face process. In this case, a surface shape of the reflecting surface 320Aa of the auxiliary reflector 320A is set to a shape of a paraboloidal column extended in a horizontal direction. According to the paraboloidal column, a sectional shape thereof along a vertical face including the optical axis Ax is constituted by a parabola having a focal point at a light emission center O of the light emitting chip 12*a* and having an axis of an axis line Ax1 directed slightly upward from the optical axis Ax (specifically, directed upward by about 2°).

Therefore, the auxiliary reflector 320A reflects light from the light emitting diode 12 as parallel light directed slightly upward from the optical axis Ax in a vertical direction and as diffusion light which diffuses widely to both left and right sides of the optical axis Ax in a horizontal direction. The light reflected from the auxiliary reflector 320A is irradiated toward a front side of the lamp by transmitting through the transparent portion 314*c* of the lens 314.

On the other hand, the auxiliary reflector 320B disposed on a lower side of the optical axis Ax is constituted integrally with the holder 318 by forming a reflecting surface 320Ba by subjecting a transversely prolonged bow shape region at a lower portion of the front face of the holder 318 to a mirror face process. In this case, a surface shape of the reflecting surface 320Ba of the auxiliary reflector 320B is set to a shape of a paraboloidal column surface extending in the horizontal direction. According to the paraboloidal column surface, a sectional shape thereof along a vertical face including the optical axis Ax is constituted by a parabola having a focal point at the light emission center O of the light emitting chip 12*a* and having an axis of line Ax1 directed slightly upward from the optical axis Ax (specifically, directed upward by about 2°) similar to the case of the reflecting surface 320Aa of the auxiliary reflector 320A.

Therefore, the auxiliary reflector 320B reflects light from the light emitting diode 12 as parallel light directed slightly upward from the optical axis Ax in the vertical direction and as diffusion light which is widely diffused to both left and right sides of the optical axis Ax in a horizontal direction. The light reflected from the auxiliary reflector 320B is irradiated toward the front side of the lamp by transmitting through the transparent portion 314*d* of the lens 314.

Figure 20:
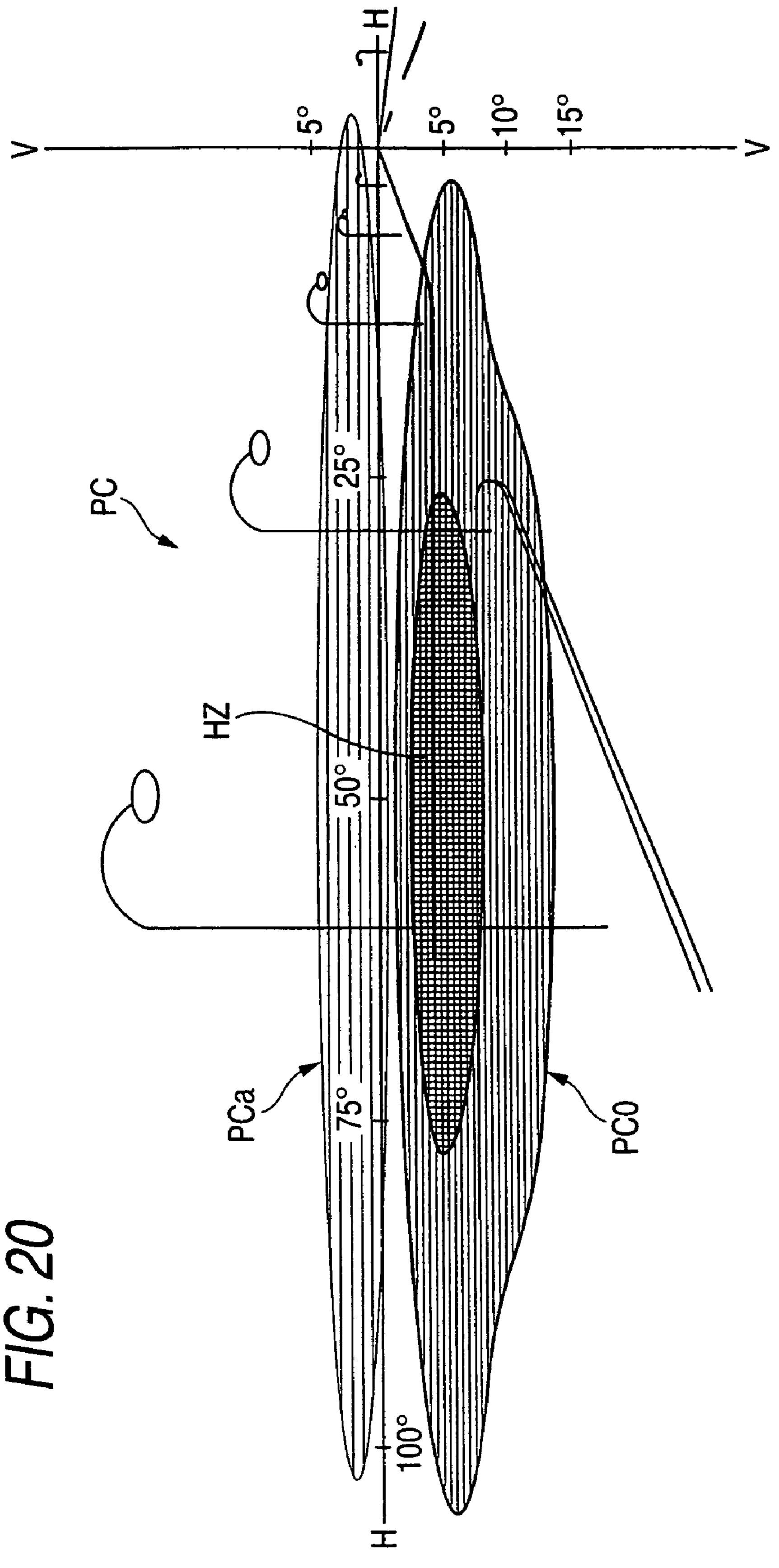
FIG. 20 is a diagram perspectively showing a transversely-prolonged light distribution pattern formed on an imaginary vertical screen arranged at a position of 25 m frontward from a vehicle by light irradiated from the vehicle lamp.

FIG. 20 is a diagram perspectively showing the transversely-prolonged light distribution pattern PC formed on the imaginary vertical screen arranged at a position of 25 m in front of the vehicle by light irradiated to a front side from the vehicle lamp 310 according to the fourth exemplary embodiment.

The transversely prolonged light distribution pattern PC comprises a basic light distribution pattern PC0 and an auxiliary light distribution pattern PCa.

The basic light distribution pattern PC0 is a light distribution pattern formed by irradiating direct light, which is incident on the rear side surface 314*b* of the lens 314 from the light emitting diode 12, from the front side surface 314*a* of the lens 314 toward the front side of the lamp.

The basic light distribution pattern PC0 is formed to diffuse widely in the horizontal direction on a left side of the V-V line. The V-V line is a vertical line which passes through H-V, H-V being a vanishing point in a direction of a front face of the vehicle of the axis line Ax0 extended in the front and rear direction of the vehicle. An upper end edge of the basic light distribution pattern PC0 is disposed slightly downward from the H-H line constituting a horizontal line passing through H-V. In this case, the basic light distribution pattern PC0 is formed over a range from a vicinity of the V-V line to about 100° on a left side thereof centering on a direction of a left side of V-V line by about 50°. A hot zone HZ, which is a high luminous intensity region, is formed by a transversely prolonged shape at a position of substantially a center in a left and right direction of the basic light distribution pattern PC0 and proximate to an upper end edge thereof.

In order to accurately form the basic light distribution pattern PC0, according to the fourth exemplary embodiment, a target irradiation angle is set at each point on the front side surface 314*a* of the lens 314, and the second freely formed curve surface constituting a rear side surface 314*b* thereof is set to have a shape of a curved surface for realizing light irradiation by the target irradiation angle.

In the vehicle lamp 310 according to the fourth exemplary embodiment, the shape of the second freely formed curve surface constituting the rear side surface 314*b* of the lens 314 is set by the same procedure as that of the first exemplary embodiment.

On the other hand, the auxiliary light distribution pattern PCa is a light distribution pattern formed by light from the light emitting diode 12 reflected by the pair of upper and lower auxiliary reflectors 320A, 320B and irradiated toward the front side of the lamp by transmitting through the transparent portions 314*c*, 314*d* of the lens 314.

The additional light pattern PCa is a light distribution pattern slenderly extended in the horizontal direction at a vicinity of an upper side of the basic light distribution pattern PC0 and is provided with a horizontal diffusion angle to a degree substantially the same as that of the basic light distribution pattern PC0. The auxiliary light distribution pattern PCa is disposed slightly proximate to the V-V line relative to the basic light distribution pattern PC0 and a lower end edge thereof is disposed substantially on the H-H line. Further, the auxiliary light distribution pattern PCa is formed by a brightness to a degree of not casting glare to a driver running on an opposed lane, a walker or the like.

Further, the auxiliary light distribution pattern PCa is formed as the light distribution pattern slenderly prolonged in the horizontal direction at an upper vicinity of the basic light distribution pattern PC0, because the respective auxiliary reflectors 320A, 320B are constituted to reflect light from the light emitting chip 12*a* as parallel light slightly upward from the optical axis Ax in the vertical direction, and as diffusion light which widely diverges to both left and right sides of the optical axis Ax in the horizontal direction. Further, the brightness of the auxiliary light distribution pattern PCa is adjusted by varying the sizes of the reflecting surfaces 320Aa, 320Ba of the respective auxiliary reflectors 320A, 320B.

As described above in detail, the vehicle lamp 310 according to the fourth exemplary embodiment is constituted to form the transversely prolonged light distribution pattern PC by deflecting and irradiating light from the light emitting diode 12 arranged on the optical axis Ax extended in the front and rear direction of the lamp to the front side of the lamp by the lens 314 arranged on the front side of the lamp. The front side surface 314*a* of the lens 314 includes the first freely formed curve surface, and therefore, the front side surface 314*a* can easily be formed in the shape extending along the surface shape of the vehicle body 2 (the shape of the curved surface extended substantially flush with the vehicle body 2 according to the fourth exemplary embodiment).

Further, the vehicle lamp 310 according to the fourth exemplary embodiment can accurately form the transversely prolonged light distribution pattern PC since the irradiation angle of light irradiated from the front side surface 314*a* of the lens 314 with respect to the optical axis Ax is set as the target irradiation angle for each point on the front side surface 314*a* in accordance with the shape and the luminous intensity distribution of the basic light distribution pattern PC0.

Further, the vehicle lamp 310 according to the fourth exemplary embodiment can provide the optical path necessary for irradiating the light without producing a stepped difference or the like at the rear side surface 314*b* since the rear side surface 314*b* of the lens 314 is constituted by the second freely formed curve surface made by continuously forming the surface elements having the inclination angles for realizing light irradiation at the target irradiation angles set to the respective points on the front side surface 314*a*.

Although the basic light distribution pattern PC0 can accurately be formed by constituting the rear side surface 314*b* of the lens 314 by the second freely formed curve surface formed in this way, the basic light distribution pattern PC0 is constituted by a transversely prolonged light distribution pattern, and therefore, a width in a vertical direction-of the rear side surface 314*b* of the lens 314 becomes narrower than a width in a left and right direction thereof. Therefore, in emitting light from the light emitting diode 12, the light advancing to spaces on both upper and lower sides thereof without being incident on the rear side surface 314*b* of the lens 314 is increased. In this respect, according to the fourth exemplary embodiment, the pair of upper and lower auxiliary reflectors 320A, 320B are provided. By diffusing and reflecting light from the light emitting diode 12 in the horizontal direction to the front side of the lamp without transmitting through a main body portion of the lens 314 (by transmitting through the respective transparent portions 314*c*, 314*d*), the transversely-prolonged auxiliary light distribution pattern PCa can additionally be formed as a portion of the transversely prolonged light distribution pattern PC, and therefore, a rate of utilizing light flux of light emitted from the light emitting diode 12 can be promoted.

In this way, according to the fourth exemplary embodiment, in the vehicle lamp 310 constituted to form the transversely prolonged light distribution pattern PC for illuminating a road on a skewed front side of the vehicle, a degree of freedom of layout of the lamp and vehicular design can be promoted, and the rate of utilizing light flux of the light emitted from the light emitting diode 12 can be promoted.

Particularly, the lens 314 of the vehicle lamp 310 according to the fourth exemplary embodiment can promote an outlook of the vehicle lamp 310 since both of the front side surface 314*a* and the rear side surface 314*b* are constituted by the freely formed curve surfaces. Therefore, a stepped difference or the like can be prevented from being formed on the surface of the lens 314.

Further, the vehicle lamp 310 according to the fourth exemplary embodiment can constitute the vehicle lamp 310 to be compact since the light source is constituted by the light emitting chip 12*a* of the light emitting diode 12 and direct light from the light emitting chip 12*a* is constituted to be incident on the lens 314.

In this case, the light emitting diode 12 is arranged to expose only the resin mold 12*b* substantially in the semispherical shape for sealing the light emitting chip 12*a* from the small hole 318*c* formed at the rear vertical face portion 318*a* of the holder 318 to the front side of the lamp, and therefore, design of the inside of a lamp chamber enlarged to be seen through the lens 314 can be improved.

Further, according to the fourth exemplary embodiment, an upper half portion of the lens 314 is formed such that the light from the light emitting diode 12 is irradiated as parallel light in the vertical direction, and a lower half portion of the lens 314 is formed such that the light from the light emitting diode 12 is irradiated to diffuse downwardly in the vertical direction. Therefore, the basic light distribution pattern PC0 of the transversely prolonged light distribution pattern PC can be formed to be bright at a vicinity of an upper end portion thereof and gradually darken toward a lower end portion thereof. The road surface on the front side of the lamp can be illuminated by substantially uniform brightness from a short distance region to a long distance region, and optical recognizability of the road surface on the front side in the direction of the vehicle advances in turns can further be promoted.

Further, according to the fourth exemplary embodiment, the respective auxiliary reflectors 320A, 320B are constituted to reflect light from the light emitting diode 12 in directions upward from the optical axis Ax, thereby, forming the transversely prolonged auxiliary light distribution pattern PCa at an upper vicinity of the transversely prolonged basic light distribution pattern PC0. Therefore, optical recognizability of not only a road surface on a front side in a vehicle advancing direction in turning the vehicle but also recognizability of a walker or the like can be promoted.

Further, although the transversely-prolonged auxiliary light distribution pattern PCa needs to be formed by a brightness to a degree of not casting glare to a driver driving on an opposed lane, a walker or the like, the brightness can easily be adjusted by a degree of diffusing or an amount of light reflected from the reflector.

Figure 21:
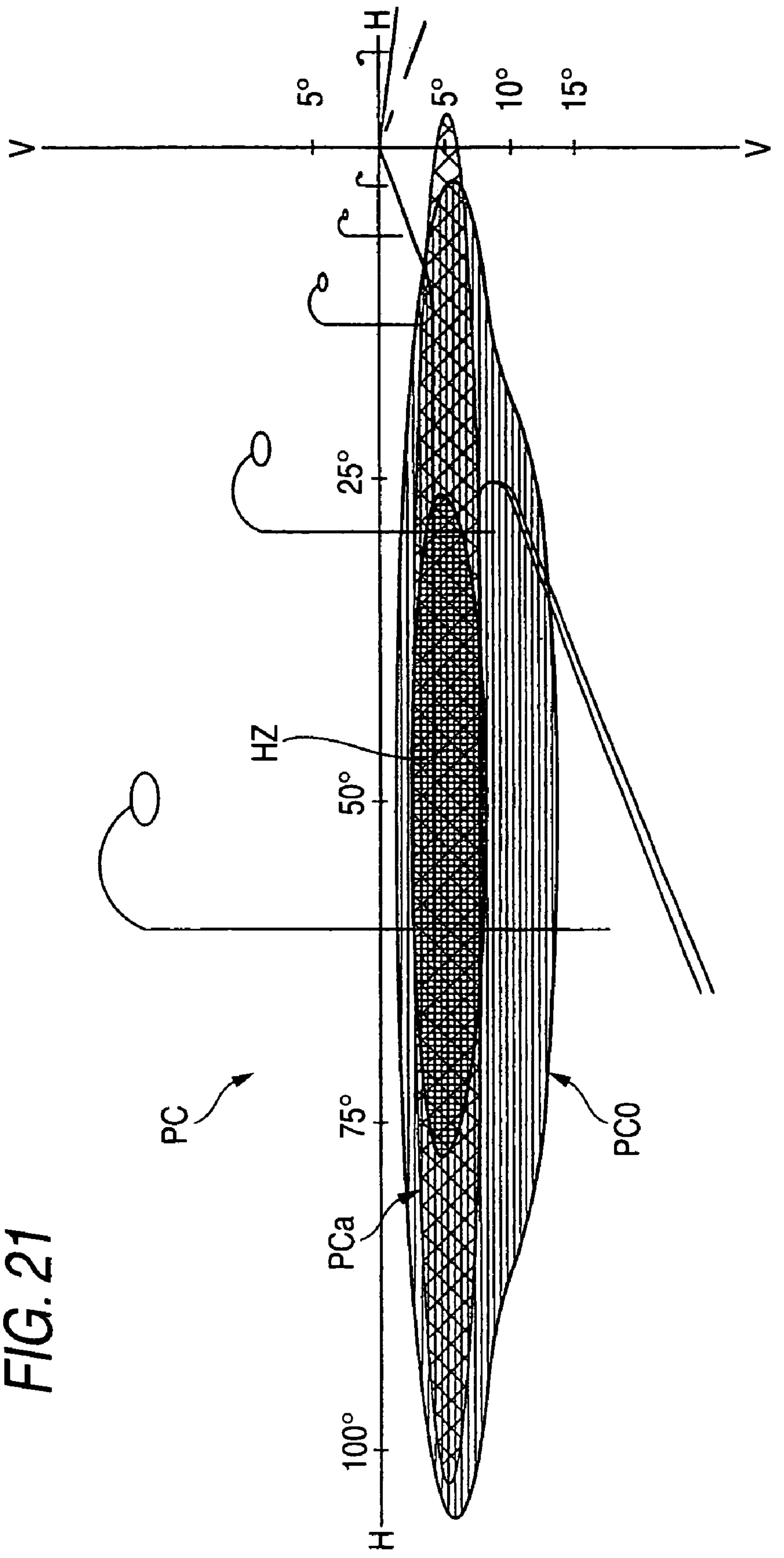
FIG. 21 is a diagram similar to FIG. 20 showing operation of a modified example of the fourth exemplary embodiment.

Further, although according to the fourth exemplary embodiment, an explanation has been given such that the respective auxiliary reflectors 320A, 320B are formed to reflect light from the light emitting diode 12 in directions upward with respect to the optical axis Ax, there can be constructed a configuration in which the respective auxiliary reflectors 320A, 320B are formed to reflect light from the light emitting diode 12 in directions downward with respect to the optical axis Ax. When constituted in this way, as shown in FIG. 21, the auxiliary light distribution pattern PCa can be formed at a position overlapping the basic light distribution pattern PC0, thereby, the transversely prolonged light distribution pattern PC can be made to be brighter.

Further, in a case in which the auxiliary light distribution pattern PCa is excessively bright in the above-described fourth exemplary embodiment, when there is constructed a configuration in which one of the upper and lower auxiliary reflectors 320A, 320B (for example, reflector 320B) reflects light from the light emitting diode 12 in a direction downward from the optical axis Ax, the brightness of the basic light distribution pattern PC0 can be increased after adjusting the auxiliary light distribution pattern PCa disposed at an upper vicinity of the basic light distribution pattern PC0 by a proper brightness.

Figure 22:
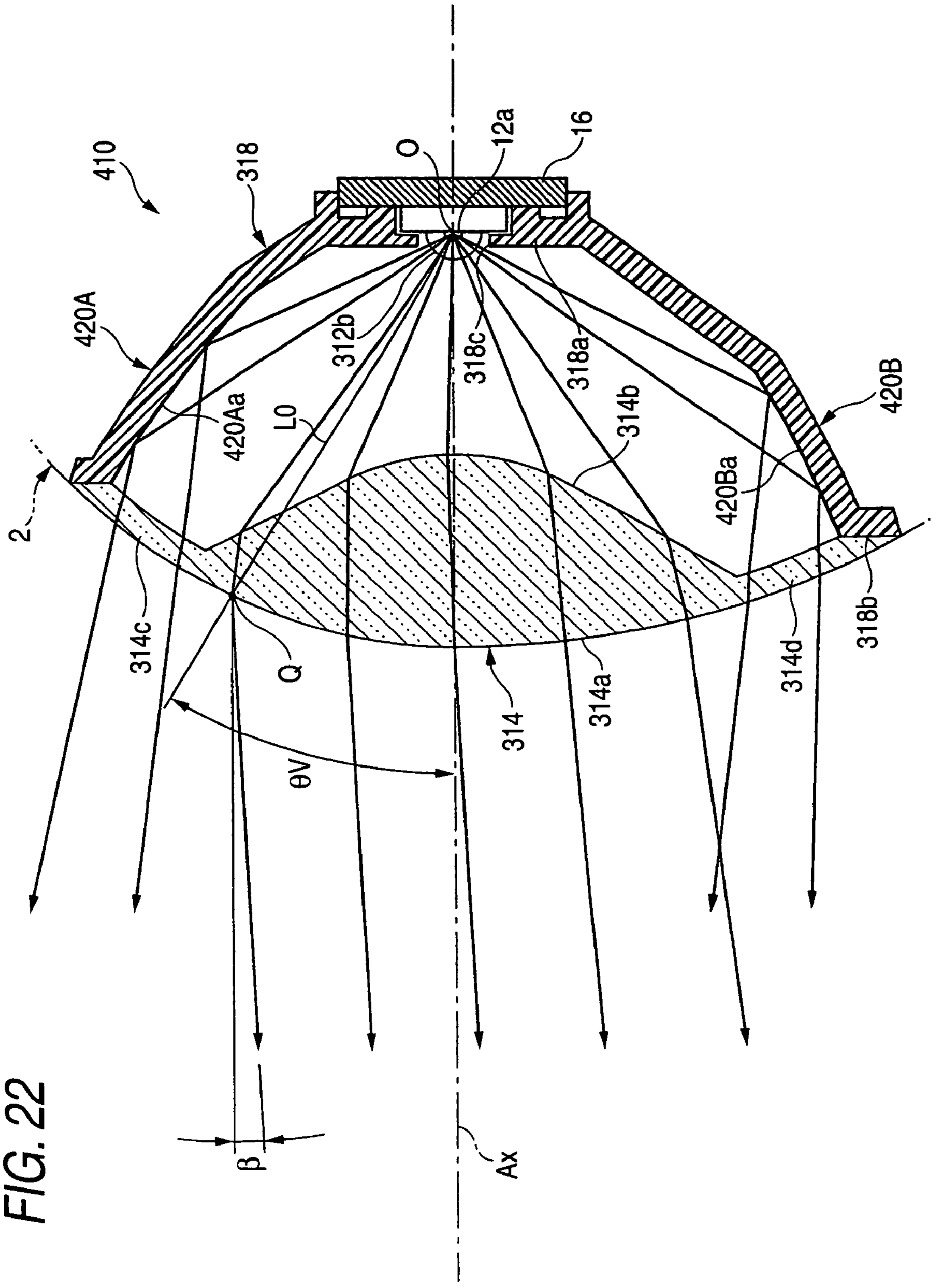
FIG. 22 is a diagram similar to FIG. 18 showing a view of the modified example of the fourth exemplary embodiment.

According to the fourth exemplary embodiment, the surface shapes of the reflecting surfaces 320Aa, 320Ba of the respective auxiliary reflectors 320A, 320B of the vehicle lamp 310 are set to the shapes of the paraboloidal column surfaces extended in the horizontal direction. In a vehicle lamp 410 shown in FIG. 22, the surface shapes of reflecting surfaces 420Aa, 420Ba of the respective auxiliary reflectors 420A, 420B can be set to a shape of a hyperboloid column face (or the shape of an ellipsoid column face) extended in the horizontal direction, and the respective reflecting surfaces 420Aa, 420Ba can be arranged to be directed slightly upward to thereby diffuse light from the light emitting diode 12 in an upper direction.

Figure 23:
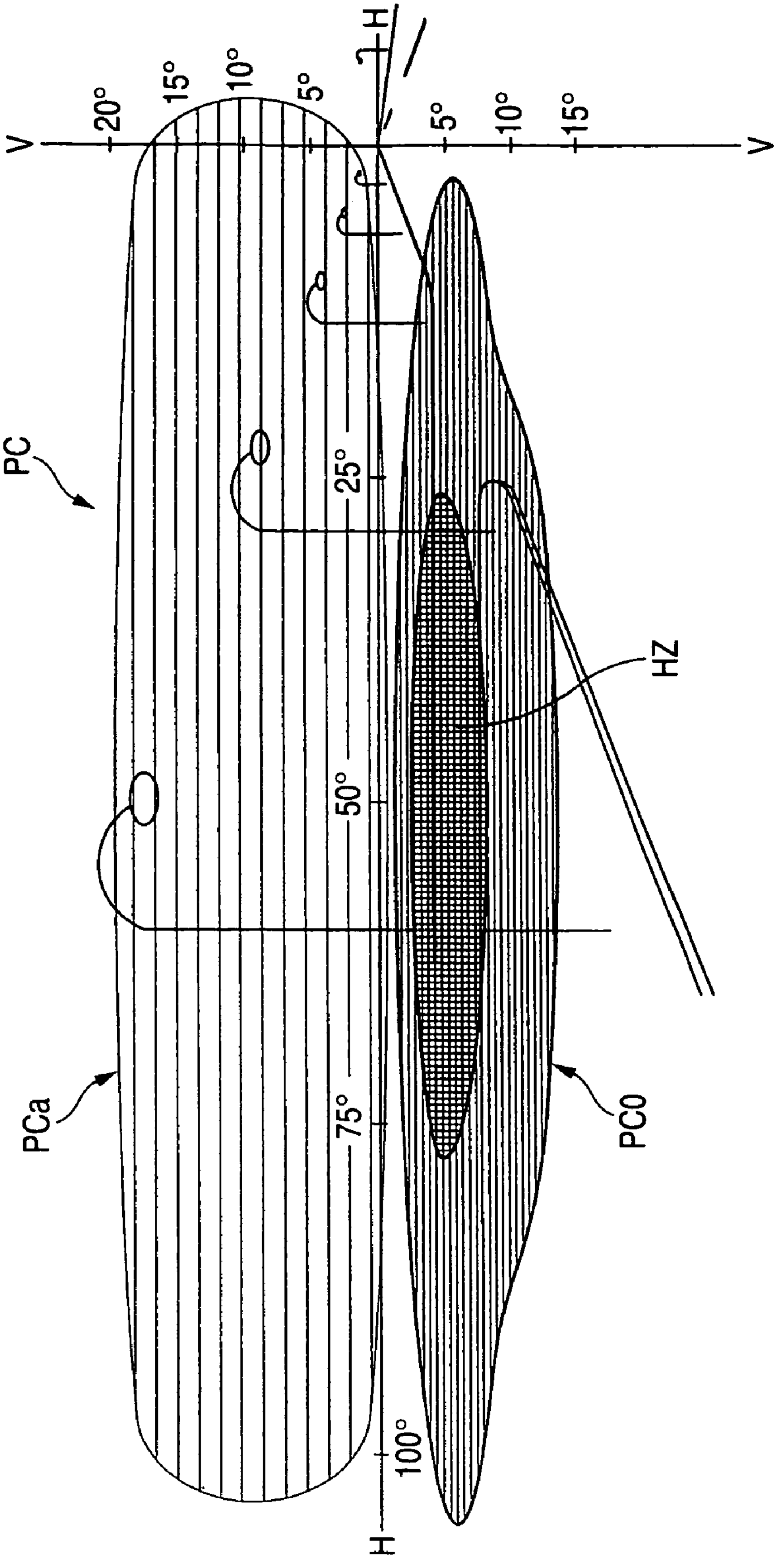
FIG. 23 is a diagram similar to FIG. 20 showing operation of the other modified example of the fourth exemplary embodiment.

By adopting such a constitution, as shown in FIG. 23, the auxiliary light distribution pattern PCa disposed at the upper vicinity of the basic light distribution pattern PC0 can be set to a shape of diffusing the auxiliary light distribution pattern PCa shown in FIG. 20 to an upper side, thereby, the optical recognizability can be promoted also for a walker or the like disposed at a vicinity of a left skewed front side of the vehicle.

Further, a lower end portion of the auxiliary light distribution pattern PCa shown in FIG. 23 can be formed to overlap an upper end portion of the basic light distribution pattern PC0.

According to the fourth exemplary embodiment, although an explanation has been given such that the both the upper and lower end portions of the lens 314 are extended to be formed with the transparent portions 314*c*, 314*d* for hermetically closing the space between the lens 314 and the holder 318, when it is not necessary to hermetically close the space (for example, when the vehicle lamp 310 is contained as the lamp unit at the inside of a lamp chamber formed by a transparent cover extended substantially flush with the surface of the vehicle body 2 and a lamp body or the like), there can be constructed a configuration which is not extended to be formed with the respective transparent portions 314*c*, 314*d*.

Further, there can also be constructed a configuration in which the vehicle lamp 310 and the vehicle lamp arranged symmetrically therewith in the left and right direction according to the fourth exemplary embodiment are switched on along with a headlamp or the like not only in turning the vehicle but also in advancing the vehicle straight ahead. For example, driving on a road having a low lighting such as a road in a residential area having few street lamps, there can be constructed a configuration of lightening the vehicle lamp in a state in which light is reduced to a degree so as not to cast glare to a walker or the like to thereby enable the promotion of optical recognizability in advancing the vehicle straight. In this case, in turning the vehicle, by increasing a light amount by controlling light, an inherent function of the vehicle lamp may be achieved.

Further, although the vehicle lamp 310 according to the fourth exemplary embodiment is constituted to switch on when the vehicle is turned to run to the left side to thereby illuminate the road surface on the left skewed front side, there can be constructed a configuration of switching on the vehicle lamp 310 also when the vehicle is turned to run to the right side. The same goes with the vehicle lamp arranged symmetrically with the vehicle lamp 310 in the left and right direction. By adopting such a configuration, the left and right sides can be further easily viewed by widely illuminating the both left and right sides of the vehicle in turning the vehicle, thereby driving safety can further be promoted.

In the above-mentioned exemplary exemplary embodiments, since the front side surface of the lens includes the first freely formed curve surface, the front side curved surface can easily be formed in a shape that extends along a shape of a surface of a vehicle body.

Further, since the irradiation angle, with respect to the optical axis, of light irradiated from the front side surface of the lens is set as the target irradiation angle for each point on the front side surface, the light distribution pattern can accurately be formed by setting the target irradiation angles of the respective points in accordance with a desired shape of the light distribution pattern or a luminous intensity distribution thereof.

Further, the rear side surface of the lens is constituted by the second freely formed curve surface made by continuously forming the surface elements having inclination angles for realizing light irradiation by target irradiation angles set to respective points on the front side surface and therefore, an optical path necessary for the light irradiation can be provided without producing a stepped difference or the like at the rear side surface.

In the above-mentioned exemplary embodiments, the second freely formed curve surface is formed by a following procedure.

First, a pertinent point on the front side surface of the lens (for example, a point disposed on the optical axis, or a point formed on an outer peripheral edge or the like) is set as a reference point. Further, a direction of light incident on the reference point at the inside of the lens necessary for irradiating light from the reference point by the target irradiation angle is calculated by using Snell's law.

Next, a starting point in forming the second freely formed curve surface is set to a pertinent position on a linear line extended in a direction of incidence of the light. Further, a first surface element constituting a portion of the second freely formed curve surface is allocated to the starting point. An angle made by a linear line extended in the direction of incidence of light with a linear line connecting the light emission center of the light source and the starting point is calculated and an inclination angle of the first surface element is calculated by using Snell's law to provide a refracting power of an amount of the angle.

Further, a calculation is carried out by a procedure similar to that in the case of the reference point for a point contiguous to the reference point on the front side surface of the lens to calculate an inclination angle of a surface element contiguous to the first surface element. By repeating similar procedures as follows and constituting a series of surface elements continuously, the second freely formed curve surface expanded over an entire region of the lens is formed.

In this way, in the vehicle lamp constituted to form the predetermined light distribution pattern by the light source and the lens arranged on the front side of the lamp of the light source, even when the front side surface of the lens is constituted by a freely formed curve surface, a desired light distribution pattern can accurately be formed. A degree of freedom of layout of the lamp and the vehicular design can thereby be promoted.

Particularly, the lens of the vehicle lamp can promote an outlook of the vehicle lamp since both the front side surface and the rear side surface include the freely formed curve surfaces. A stepped difference or the like can thereby be prevented from being formed on the surface of the lens.

Further, although explanations has been given of the vehicle lamps 10, 110, 210, 310 and 410 mounted to the left front end corner portion of the vehicle body in the above-mentioned exemplary embodiments, also with regard to vehicle lamps mounted to a right front end corner portion of the vehicle body, by forming the vehicle lamps 10, 110, 210, 310 and 410 by shapes which are symmetrical in a left and right direction of the vehicle, operation and effect similar to those of the respective exemplary embodiments can be achieved.

While description has been made in connection with exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A vehicle lamp comprising:

a light source;

a lens that is arranged on a front side of the light source, and that deflects and irradiates light from the light source toward a front side of the vehicle lamp, wherein a front side surface of the lens includes a first freely formed curve surface, an irradiation angle of the light to be irradiated from the front side surface with respect to the optical axis is set as a target irradiation angle at each point of the front side surface, and a rear side surface of the lens includes a second freely formed curve surface formed by continuous surface elements, each having an inclination angle that realizes a light irradiation by the target irradiation angle set at respective points of the front side surface, further comprising an auxiliary reflector disposed on at least one of an upper side and a lower side of an optical axis, wherein the auxiliary reflector reflects and diffuses the light from the light source toward the front side of the vehicle lamp without transmitting through the lens.

2. The vehicle lamp according to claim 1, wherein the front side surface of the lens further includes a third curve surface in a center region thereof at a vicinity of an optical axis, wherein the third curve surface is surrounded by the first curve surface and is homothetic to the first curve surface with a position of the light source being a homothetic center, and the first curve surface and the third curve surface are connected by a ring-shaped wall surface.

3. The vehicle lamp according to claim 2, wherein an inclination angle of the ring-shaped wall surface within a plane including the optical axis is set to the irradiation angle of the light to be irradiated from an outer peripheral edge portion of the center region.

4. The vehicle lamp according to claim 1, further comprising a reflector having a reflecting surface of a spheroidal shape, wherein the light source is arranged at a first focal point of the spheroidal shape, and the light is converged to a second focal point of the spheroidal shape, the first focal point being provided to a rear of the second focal point.

5. The vehicle lamp according to claim 1, wherein an upper half portion of the lens is formed such that the light from the light source is irradiated as a parallel light in a vertical direction, and a lower half portion of the lens is formed such that the light from the light source is irradiated as a diffusion light to a lower direction in a vertical direction.

6. The vehicle lamp according to claim 1, wherein the auxiliary reflector is formed such that the light from the light source is reflected upward with respect to the optical axis.

7. The vehicle lamp according to claim 1, wherein the light source includes a light emitting chip of a light emitting element, and a direct light from the light emitting chip is incident on the lens without sustaining prior reflection or refraction.

8. The vehicle lamp according to claim 1, wherein the light source is arranged on an optical axis that extends in a front and rear direction of the lamp.

9. The vehicle lamp according to claim 1, wherein the light source is arranged on the optical axis that extends in a direction inclined by a predetermined angle to an outer side in a vehicle width direction with respect to a front and rear direction of the vehicle.

10. The vehicle lamp according to claim 1, wherein the first curve surface is formed so as to correspond to a shape of an exterior of a vehicle.

11. A vehicle lamp comprising:

a light source; and a lens that is arranged on a front side of the light source, and that deflects and irradiates light from the light source toward a front side of the vehicle lamp, wherein a front side surface of the lens includes a first curve surface, an irradiation angle of the light to be irradiated from the front side surface with respect to the optical axis is set as a target irradiation angle at each point of the front side surface, and a rear side surface of the lens includes a second curve surface formed by continuous surface elements, each having an inclination angle that realizes a light irradiation by the target irradiation angle set at respective points of the front side surface;

wherein the front side surface of the lens further includes a third curve surface in a center region thereof at a vicinity of an optical axis, wherein the third curve surface is surrounded by the first curve surface and is homothetic to the first curve surface with a position of the light source being a homothetic center, and the first curve surface and the third curve surface are connected by a ring-shaped wall surface.

12. The vehicle lamp according to claim 11, wherein an inclination angle of the ring-shaped wall surface within a plane including the optical axis is set to the irradiation angle of the light to be irradiated from an outer peripheral edge portion of the center region.

13. The vehicle lamp according to claim 11, further comprising a reflector having a reflecting surface of a spheroidal shape, wherein the light source is arranged at a first focal point of the spheroidal shape, and the light is converged to a second focal point of the spheroidal shape, the first focal point being provided to a rear of the second focal point.

14. The vehicle lamp according to claim 11, wherein the light source includes a light emitting chip of a light emitting element, and a direct light from the light emitting chip is incident on the lens without sustaining prior reflection or refraction.

15. The vehicle lamp according to claim 11, wherein the light source is arranged on an optical axis that extends in a front and rear direction of the lamp.

* * * * *